(12) United States Patent
Barkan et al.

(10) Patent No.: US 12,020,112 B2
(45) Date of Patent: Jun. 25, 2024

(54) SCANNER HAVING INDUCTIVE CHARGING

(71) Applicant: ZEBRA TECHNOLOGIES CORPORATION, Lincolnshire, IL (US)

(72) Inventors: Edward Barkan, Miller Place, NY (US); Darran Michael Handshaw, Sound Beach, NY (US); Christopher P. Klicpera, Westbury, NY (US); Mark Drzymala, Saint James, NY (US); Stefanie Handshaw, Sound Beach, NY (US)

(73) Assignee: Zebra Technologies Corporation, Lincolnshire, IL (US)

( * ) Notice: Subject to any disclaimer, the term of this patent is extended or adjusted under 35 U.S.C. 154(b) by 157 days.

(21) Appl. No.: 16/600,297

(22) Filed: Oct. 11, 2019

(65) Prior Publication Data
US 2021/0111580 A1    Apr. 15, 2021

(51) Int. Cl.
*H02J 50/90* (2016.01)
*G06K 7/10* (2006.01)
(Continued)

(52) U.S. Cl.
CPC ........ *G06K 7/10881* (2013.01); *H02J 50/005* (2020.01); *H02J 50/10* (2016.02); *H02J 50/90* (2016.02)

(58) Field of Classification Search
CPC .......... H02J 50/005; H02J 7/00; H02J 7/0077; H02J 7/0085; H02J 7/0088; H02J 7/025; H02J 7/00032; H02J 7/00034; H02J 7/0003; H02J 7/00036; H02J 7/00045; H02J 7/00047; H02J 7/0019; H02J 7/0021; H02J 7/0022; H02J 7/0027; G06K 7/109; G06K 7/10732; G06K 7/10; G06K 7/14; G06K 7/10821; G06K 7/1413; G06K 7/089; G06K 9/228; G06K 19/0704
(Continued)

(56) References Cited

U.S. PATENT DOCUMENTS

| | | | |
|---|---|---|---|
| 6,053,413 A * | 4/2000 | Swift | G06K 7/10554 235/462.43 |
| 2003/0114899 A1* | 6/2003 | Woods | A61N 1/3787 607/60 |

(Continued)

FOREIGN PATENT DOCUMENTS

JP    2009-169585    *   7/2009    ............... G06K 7/01

*Primary Examiner* — Edward Tso
*Assistant Examiner* — Ahmed H Omar

(57) ABSTRACT

A variety of barcode scanner assemblies for inductive charging include a reader, a stand, a first inductive coil having a first coil axis, and a second inductive coil having a second coil axis. For some assemblies, in the charging position, gravity and a cradle of the stand urge alignment of the first inductive coil and the second inductive coil along the first coil axis and the second coil axis and minimize a gap between the first coil axis and the second coil axis. For some assemblies, in the charging position, a torque is exerted upon the reader by gravity, the torque urging proximity between the first inductive coil and the second inductive coil and alignment features of the stand urge alignment of the first inductive coil and the second inductive coil along the first and second coil axes.

15 Claims, 20 Drawing Sheets

(51) Int. Cl.
*H02J 50/00* (2016.01)
*H02J 50/10* (2016.01)

(58) Field of Classification Search
USPC .......................................... 320/108
See application file for complete search history.

(56) References Cited

U.S. PATENT DOCUMENTS

| | | | | |
|---|---|---|---|---|
| 2010/0308116 | A1* | 12/2010 | Sani | A45C 11/00 248/346.03 |
| 2016/0094070 | A1* | 3/2016 | Mazzone | H02J 50/10 320/115 |
| 2016/0141908 | A1* | 5/2016 | Jakl | H02J 50/10 320/108 |
| 2016/0246265 | A1* | 8/2016 | An | H02J 7/025 |
| 2016/0350563 | A1* | 12/2016 | Ye | G06K 7/109 |
| 2018/0293412 | A1* | 10/2018 | Volta | H02J 7/00 |
| 2020/0106279 | A1* | 4/2020 | Di Bari | G06K 7/1413 |

\* cited by examiner

SCANNER HAVING INDUCTIVE CHARGING

BACKGROUND OF THE INVENTION

Barcode and other scanning devices generally capture images within a given field of view. In some instances, handheld barcode reader assemblies include a reader that is selectively positioned by a user to assist with capturing a suitable image of an item. Such readers are typically are used in conjunction with stands that receive a portion of the reader. Charging of a handheld reader traditionally is achieved via direct electrical contact with the stand, which may be directly connected to an external electrical source or may include a battery.

However, traditional charging has several notable drawbacks. If incorrectly placed, direct contact between the electrical contacts on the reader and the stand may not occur, and the reader may not charge. The electrical connections can be difficult to clean, which is particularly problematic in a healthcare environment. Further, the electrical connections are not sealed to water, dust, and electrostatic discharge (ESD) and are subject to repetitive cycling failure.

Some of the difficulties of traditional charging are addressed by providing inductive charging systems for handheld barcode reader assemblies. However, inductive charging presents different problems. With traditional contact-based systems in handheld barcode reader assemblies, the contacts are either connected, or they are not, so when the user hears the stand chirp or sees the stand flash lights, the user knows the reader is charging. However, when the coils in an inductive charge system are coupled, they may not be coupled efficiently. This means that even though the user might place the reader in the stand and hear or see a positive indication that charging is taking place, inefficient coupling may not achieve the charge rate that is required.

Such an inefficient charge rate is particularly problematic for barcode reader assemblies using inductive charging in which the stand is a presentation cradle. In presentation cradles, the reader is always looking for the presence of an object. If the reader believes an object is present, it will continually try to scan, resulting in high power consumption. Should a user place the reader into the cradle in a less than perfect manner, they may return to find that the reader is dead and not usable for the next transaction due to inefficient charging.

Accordingly, there is a need for improved systems, methods, and devices to address these issues.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1A:
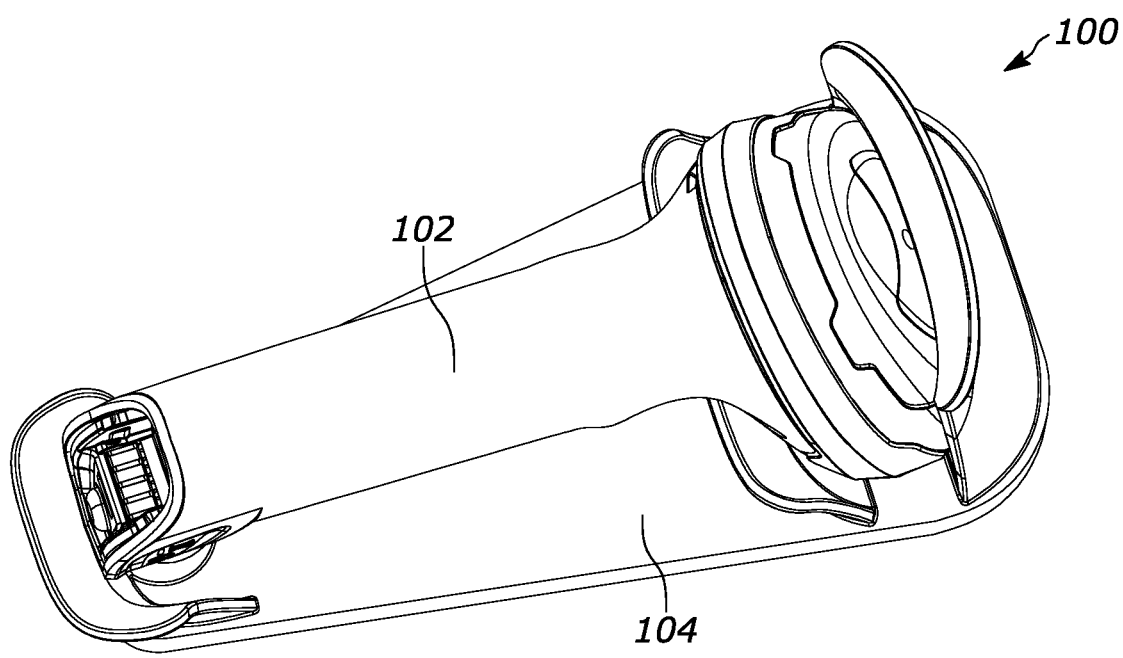
FIG. 1A is a top isometric view of a first arrangement of a handheld barcode reader assembly having a reader, a stand, and inductive charging coils.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

According to a first aspect, a barcode scanner assembly for inductive charging includes a reader having a first inductive coil and a stand having a cradle and a second inductive coil. The first inductive coil and the second inductive coil each have a first coil axis and a second coil axis. In the charging position, gravity and the cradle urge alignment of the first inductive coil and the second inductive coil along the first coil axis and the second coil axis and minimize a gap between the first coil axis and the second coil axis. The reader further has a longitudinal axis and includes a head, a handle, a foot, and a reader enclosure. The head includes a nose extending outwardly from the longitudinal axis, a top, and a chin. The foot is connected to the handle and extends outwardly from the longitudinal axis and the body of the handle. The reader enclosure includes a reader charging portion, and the first inductive coil is provided within the reader charging portion. The stand further includes a base. The cradle extends from the base and includes a stand enclosure having a stand charging portion. The second inductive coil is provided within the stand charging portion. The cradle further includes at least one of a forward wedge and a side wedge.

According to a second aspect, a barcode scanner assembly for inductive charging includes a reader having a first inductive coil and a stand having a second inductive coil and alignment features configured to engage the reader in a charging position. In the charging position, a torque is exerted upon the reader by gravity, the torque urging proximity between the first inductive coil and the second inductive coil. The first inductive coil and the second inductive coil each have a first coil axis and a second coil axis, and, in the charging position, the alignment features of the stand urge alignment of the first inductive coil and the second inductive coil along the first coil axis and the second coil axis. The reader has a longitudinal axis and further includes a reader enclosure, a head, a handle, and a foot. The reader enclosure includes a reader charging portion, and the first inductive coil is provided within the reader charging portion. The head includes a nose extending outward from the longitudinal axis, a top, and a chin. The handle is connected to the head and has a body. The foot is connected to the handle and extends outward from the longitudinal axis and the body of the handle. The stand further includes a base and a stand enclosure. The stand enclosure has a stand charging portion, and the second inductive coil is provided within the stand charging portion.

In some forms, the side wedge may be configured to engage the head of the reader when the reader is in a charging position to prevent movement of the reader along the first axis of the first inductive coil. The forward wedge may be at least one of a first forward wedge configured to engage the head of the reader when the reader is in a charging position to prevent movement of the reader in the direction of the longitudinal axis of the reader, and a second forward wedge configured to engage the chin of the head of the reader when the reader is in a charging position to prevent movement of the reader in the direction of the longitudinal axis of the reader.

In some forms, the stand may include a foot platform extending from the base. The foot platform may raise the foot of the reader above the nose of the reader when the reader is in the charging position.

In other forms, the stand may include a foot wedge configured to engage the foot of the reader when the reader is in the charging position to prevent movement of the reader along at least one of the longitudinal axis of the reader and the first axis of the first inductive coil. In other forms, the cradle may include two side wedges configured to prevent movement of the reader along the first axis of the first inductive coil In yet other forms, the forward wedge may include a projection located along the top of the head of the reader when the reader is in a charging position. The second inductive coil may be located in the projection of the forward wedge. The projection may include a flared surface to facilitate placement of the head of the reader in the cradle of the base.

In some forms, the stand may include a USB port for charging the second inductive coil, and the second inductive coil may be configured to receive only the current provided via USB charging. The barcode reader assembly may include an alerting mechanism to inform a user of a low charge of the first inductive coil. The barcode reader assembly may include an alerting mechanism to confirm charging of the first inductive coil when the reader is placed in the charging position that sounds only when adequate charge is detected in the first inductive coil.

In some forms, the low charge of the first inductive coil may be detected by at least one of a differential threshold between the power in the first inductive coil and the second inductive coil being exceeded, and the first inductive coil dropping below a minimum threshold based on coil efficiencies, charger efficiencies, and/or anticipated USB power levels. The barcode reader assembly may include a motor to vibrate the reader into a charging position if a low charge of the first inductive coil is detected.

In other forms, the top of the head of the reader may have a top surface. The stand may include a projection located along the top of the head when the reader is in the charging position. The projection may cover at least 60% of the top surface of the reader when the reader is in the charging position.

In still other forms, the barcode reader assembly may include one of the group consisting of a magnetic sensor system and a capacitive proximity sensor system to determine whether the reader is in the charging position. The magnetic sensor system may include a magnetic field sensor and a magnet. The capacitive proximity sensor system may include a capacitive proximity sensor and a capacitive component.

In some forms, the reader charging portion may be located in the foot of the reader. The alignment features of the stand may include an incline configured to be adjacent to the foot of the reader when the reader is in the charging position and a foot cradle. The foot cradle may include side wedges configured to engage the foot and the handle of the reader when the reader is in a charging position to prevent movement of the reader in the direction of the first coil axis of the first inductive coil.

In other forms, the stand may include a flexible arm and a presentation cradle. The stand charging portion and the alignment features may be located in the presentation cradle. The flexible arm may connect the base to the presentation cradle.

In yet other forms, the nose of the reader may include a cavity between the chin and the top. The cavity may include three cavity sides and a securement recess in one of the cavity sides. The stand enclosure may include three enclosure sides, each of the three enclosure sides configured to be adjacent to one of the three cavity sides. The stand enclosure may include a catch on one of the three enclosure sides to engage the securement recess of the reader. The reader enclosure may include a first reader charging portion, the first inductive coil provided within the first reader charging portion, the first reader charging portion located along one of the three cavity sides. The stand enclosure may include a first stand charging portion, the second inductive coil provided within the first stand charging portion, the first stand charging portion located along one of the three enclosure sides. The reader enclosure may include a second reader charging portion, a third inductive coil provided within the second reader charging portion, the second reader charging portion located along one of the three cavity sides. The stand enclosure may include a second stand charging portion, a fourth inductive coil provided within the second stand charging portion, the second charging portion located along one of the three enclosure sides. In the charging position, the catch may engage the securement recess of the reader to urge alignment of the first inductive coil and the second inductive coil, and to further urge alignment of the third inductive coil and the fourth inductive coil.

In some forms, the nose of the reader may include a cavity between the chin and the top, the cavity including three cavity sides and a securement recess in one of the cavity sides. The alignment features of the stand may include a locking clip configured to engage the securement recess of the reader. The head of the reader may include rail recesses that engage the rails of the frame of the stand when the reader is in the charging position.

In some forms, the top of the reader may include a securement recess. The alignment features of the stand may include a hook configured to engage the securement recess of the reader.

In some forms, the stand charging portion is located in a hinged flap rotatable relative to the longitudinal axis of the reader and located adjacent to the top of the head of the reader when the reader is in the charging position.

In other forms, the stand may include a frame configured to surround the reader when the reader is in the charging position. The alignment features may include rails along the frame configured to engage the head of the reader when the reader is in the charging position.

In still other forms, the nose of the reader may include a cavity between the chin and the top. The stand may include a hook configured for insertion into the cavity. The stand charging portion may be located within the hook of the stand. The reader may hang vertically within the stand when the reader is in the charging position.

Figure 1B:
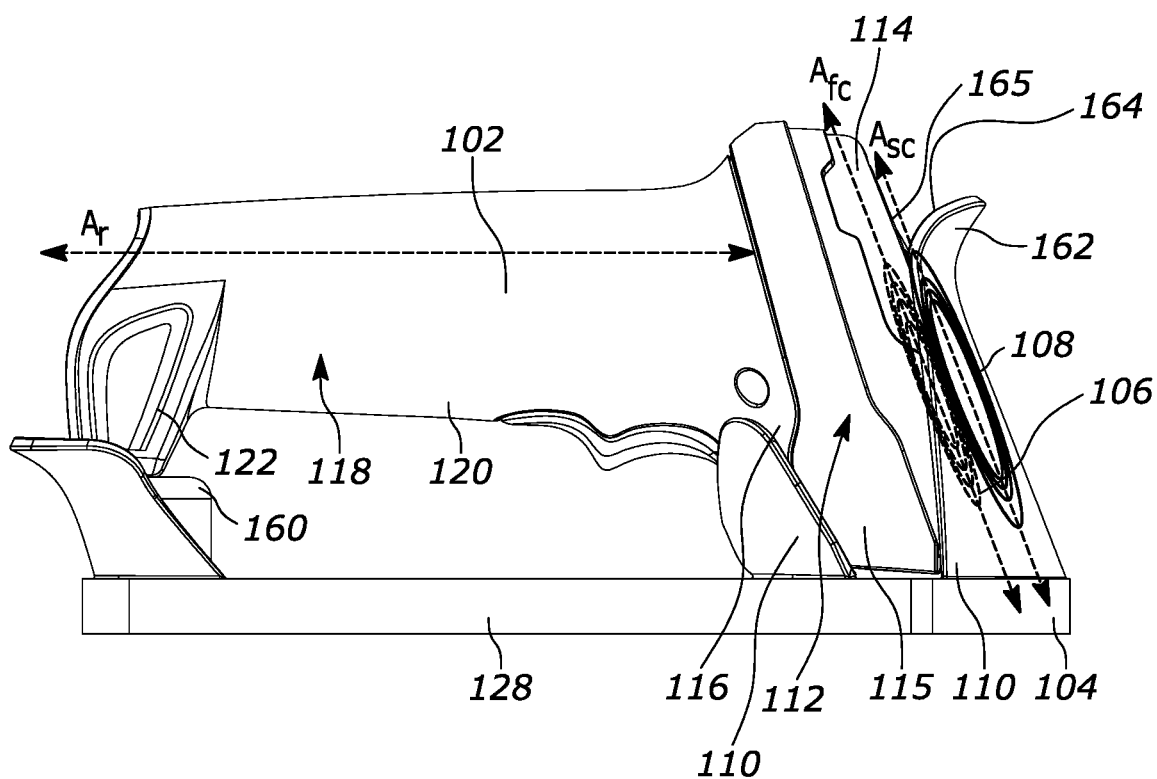
FIG. 1B is a side view of the first arrangement of the handheld barcode reader assembly of FIG. 1A with inductive charging coils shown in a cut away view.

Turning to the figures, as shown in FIGS. 1A-1D, a barcode reader assembly 100 for inductive charging includes a reader 102 and a stand 104. As shown in FIG. 1B, the reader 102 includes a first inductive coil 106, and the stand 104 includes a second inductive coil 108 and a cradle 110. The first inductive coil 106 has a first coil axis $A_{fc}$, and the second inductive coil 108 has a second coil axis $A_{sc}$. In a charging position, gravity and the cradle 110 urge alignment of the first inductive coil 106 and the second inductive coil 108 along the first coil axis $A_{fc}$ and the second coil axis $A_{sc}$ and minimize a gap between the first coil axis $A_{fc}$ and the second coil axis $A_{sc}$. Put another way, the barcode reader assembly is arranged such that the force exerted by gravity on the reader 102 facilitates efficient charging of the barcode reader assembly 100. A torque is exerted upon the reader 102 by gravity. The torque urges proximity between the first inductive coil 106 and the second inductive coil 108. Alignment features of the stand 104, which engage the reader 102 in the charging position and are described in greater detail below, urge alignment of the first inductive coil 106 and the second inductive coil 108 along the first coil axis $A_{fc}$ and the second coil axis $A_{sc}$.

Figure 1C:
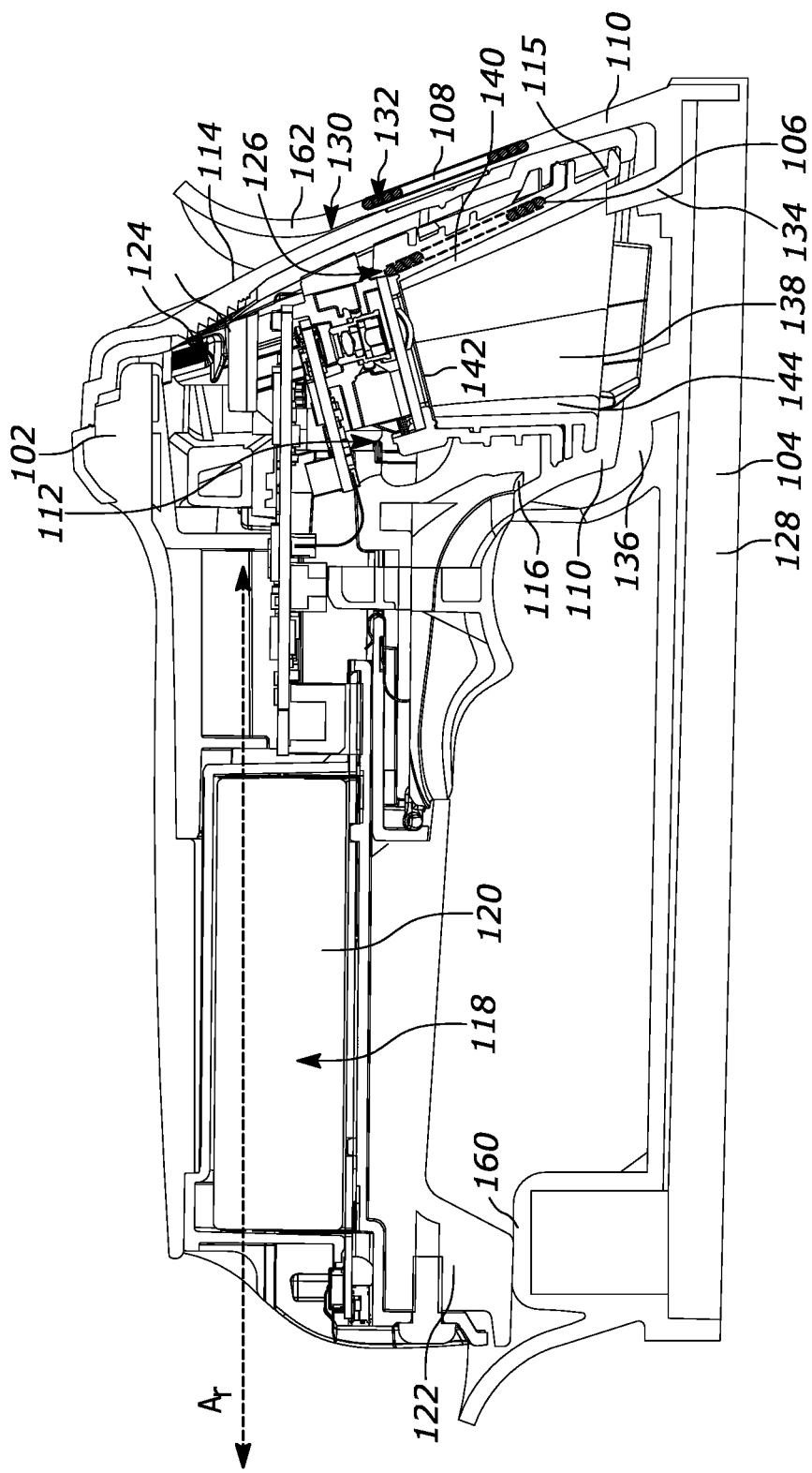
FIG. 1C is a cross-sectional side view of the first arrangement of the handheld barcode reader assembly of FIGS. 1A and 1B.

As shown in FIGS. 1B and 1C, the reader 102 has a longitudinal axis $A_r$. The reader 102 further includes a head 112 that extends outwardly from the longitudinal axis $A_r$, a top 114, a nose 115, and a chin 116. A handle 118 is connected to the head 112. The handle 118 has a body 120. A foot 122 of the reader 102 is connected to the handle 120. The foot 122 extends outwardly from the longitudinal axis $A_r$. As shown in FIG. 1C, the reader 102 further includes a reader enclosure 124 including a reader charging portion 126. The first inductive coil 106 is provided within the reader charging portion 126.

As shown in FIGS. 1B and 1C, the stand 104 includes a base 128. The cradle 110 extends from the base 128. As shown in FIG. 1C, the cradle 110 includes a stand enclosure 130 having a stand charging portion 132. The second inductive coil 108 is provided within the stand charging portion 132.

As best shown in FIG. 1C, the cradle 110 includes a first forward wedge 134 and a second forward wedge 136, both of which are configured to prevent movement of the reader 102 in the direction of the longitudinal axis $A_r$ when the reader 102 is in the charging position. The forward wedge 134 of the cradle 110 engages the head 112 of the reader 102. More specifically, the head 112 of the reader 102 includes a cavity 138 having a first cavity side 140, a second cavity side 142, and a third cavity side 144, and the forward wedge 134 of the cradle 110 of the stand 104 engages the first cavity side 140 of the head 112 of the reader 102. The second forward wedge 136 of the cradle 110 of the stand 104 engages the chin 116 of the reader 102.

Figure 1D:
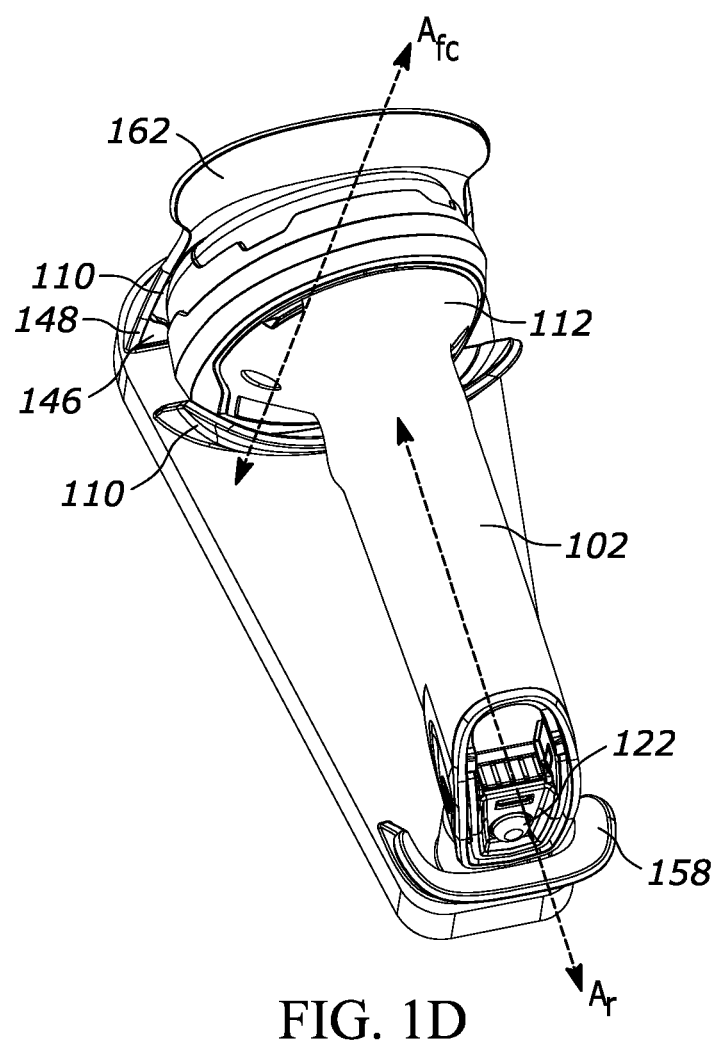
FIG. 1D is a rear isometric view of the first arrangement of the handheld barcode reader assembly of FIGS. 1A-1C.

As best shown in FIG. 1D, the cradle 110 further includes a first side wedge 146 and a second side wedge 148. Both the first side wedge 146 and the second side wedge 148 are configured to engage the head 112 of the reader 102 when the reader 102 is in a charging position to prevent movement of the reader along the first coil axis $A_{fc}$ of the first inductive coil 106. The first side wedge 146 and the second side wedge 148 may be connected to one another and disposed at different angles relative to the longitudinal axis $A_r$ or the head 112 of the reader 102 to urge alignment of the first inductive coil 106 and the second inductive coil 108 by constricting movement of the reader 102 in different directions.

For purposes of efficient inductive charging, a gap between the first inductive coil 106 and the second inductive coil 108 is minimized when the barcode reader assembly 100 is in a charging position. This is achieved by a combination of gravity acting on the reader 102 and alignment features of the reader 102 and/or stand 104. Alignment features include, but are not limited to, the first forward wedge 134, the second forward wedge 136, the first side wedge 146, and the second side wedge 148. As another example of an alignment feature, the stand 104 may include a foot wedge 158, shown in FIG. 2, configured to engage the foot 122 of the reader 102 when the reader 102 is in the charging position to prevent movement of the reader 102 along at least one of the longitudinal axis $A_r$ and the first coil axis $A_{fc}$ of the first inductive coil 106. Additional forward wedges, side wedges, and/or foot wedges, or other comparable alignment features, are further contemplated as being desirable for other arrangements of the barcode reader assembly 100.

The barcode reader assembly 100 has other features that allow gravity to increase the proximity of the first inductive coil 106 and the second inductive coil 108. For example, as shown in FIGS. 1B and 1C, the stand 104 further includes a foot platform 160 extending from the base 128. The foot platform 160 raises the foot 122 of the reader 102 above the head 112 of the reader, thereby causing the reader 102 to slide forward as a result of gravity. This places the reader charging portion 126 of the reader enclosure 124 and the stand charging portion 132 of the stand enclosure 130 adjacent one another, thereby minimizing the gap between the first inductive coil 106 and the second inductive coil 108.

As shown in FIG. 1D, the barcode reader assembly 100 incorporates tall lead-in surfaces and broad ramps to help push the reader 102 into the charging position even when the reader 102 is placed into the cradle 110 in an offset manner. These features prevent the reader 102 from sitting in a manner where the first inductive coil 106 and the second inductive coil 108 are unable to couple, and thereby help prevent inefficient charging or a complete lack of charging. As an example, as shown in FIG. 1B, the first forward wedge 134 may include a projection 162 located along the top 114 of the head 112 when the reader 102 is in a charging position. This projection 162 includes a flared surface 164 to facilitate placement of the head 112 of the reader 102 in the cradle 110 of the base 128. The top 114 of the head 112 of the reader 102 includes a top surface 165, and the projection 162 covers at least 60% of the top surface 165 of the reader 102 when the reader 102 is in the charging position. As shown in FIG. 1C, the stand charging portion 126 of the stand enclosure 130 is located in the projection 162 such that the second inductive coil 108 is located in the projection 162.

Numerous other arrangements of a barcode reader assembly that improves inductive charging are discussed below. These arrangements share many features already described with respect to barcode reader assembly 100. Common features are identified in each of the subsequent arrangements by the same reference number increased by a factor of one hundred. For example, the reader of barcode reader assembly 100 is identified by reference number 102. The readers of subsequent arrangements are identified by reference numbers 202, 302, 402, and so forth. Unless otherwise stated, features that share this common numbering scheme are interchangeable between various arrangements. To avoid duplicative descriptions, interchangeable features are not described with respect to FIGS. 2-14.

Figure 2:
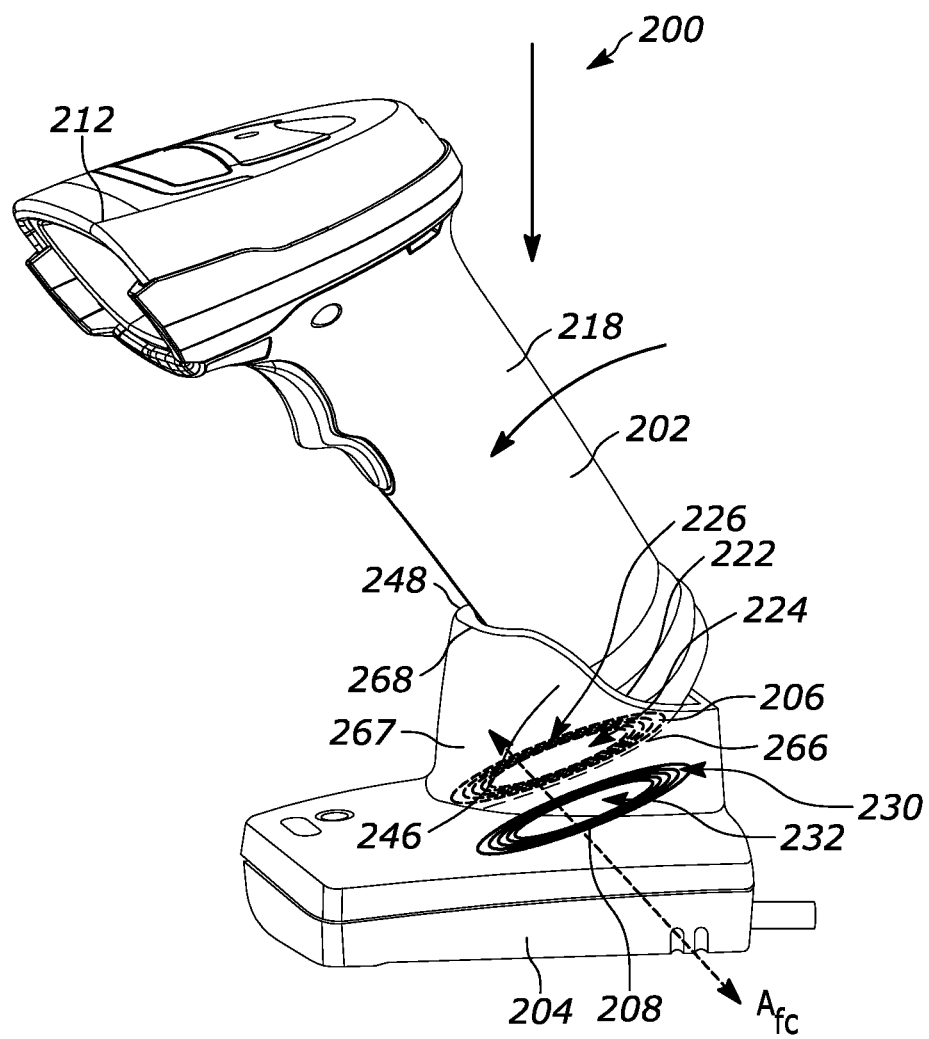
FIG. 2 is an isometric view of a second arrangement of a handheld barcode reader assembly having a reader, a stand, and inductive charging coils with the induction coils shown in a cut away view.

FIG. 2 illustrates a barcode reader assembly 200 where the reader charging portion 226 is located in the foot 222 of the reader 202. Consequently, the reader enclosure 224 containing the first inductive coil 206 is also located in the foot 222 of the reader 202. The alignment features of barcode reader assembly 200 include an incline 266 of the stand 204 configured to be adjacent to the foot 222 of the reader 202 when the reader 202 is in the charging position. The stand 204 also has a foot cradle 267. The foot cradle 267 includes a first side wedge 246 and a second side wedge 248 configured to engage the foot 222 of the reader 202 and the handle 218 of the reader 202 when the reader 202 is in the charging position to prevent movement of the reader 202 in the direction of the first coil axis $A_{fc}$ of the first inductive coil 106.

As shown by arrows in FIG. 2, the weight of the head 212 of the reader 202, as it is positioned as a result of the incline 266 of the stand 204 when in a charging position, causes gravity to exert both a downward force and a torque on the reader 202. The second inductive coil 208 is located in the stand charging portion 232 in the stand enclosure 230 along the incline 266 of the stand 204. When the reader 202 is in the charging position, the stand charging portion 232 is disposed adjacent the reader charging portion 226 in the reader enclosure 224, which includes the first inductive coil 206.

The foot cradle 267 surrounds the foot 222 of the reader 202 continuously in the arrangement shown in FIG. 2. Further, the height of the foot cradle 267 varies around its circumference, being higher in an area below the head 212 of the reader 202 in order to prevent the reader 202 from tipping forward out of the foot cradle 267. This higher area is a forward rest 268. The reader 202 is inserted into the stand 204 from above and rotates forward to stop on the forward rest 268.

Figure 3:
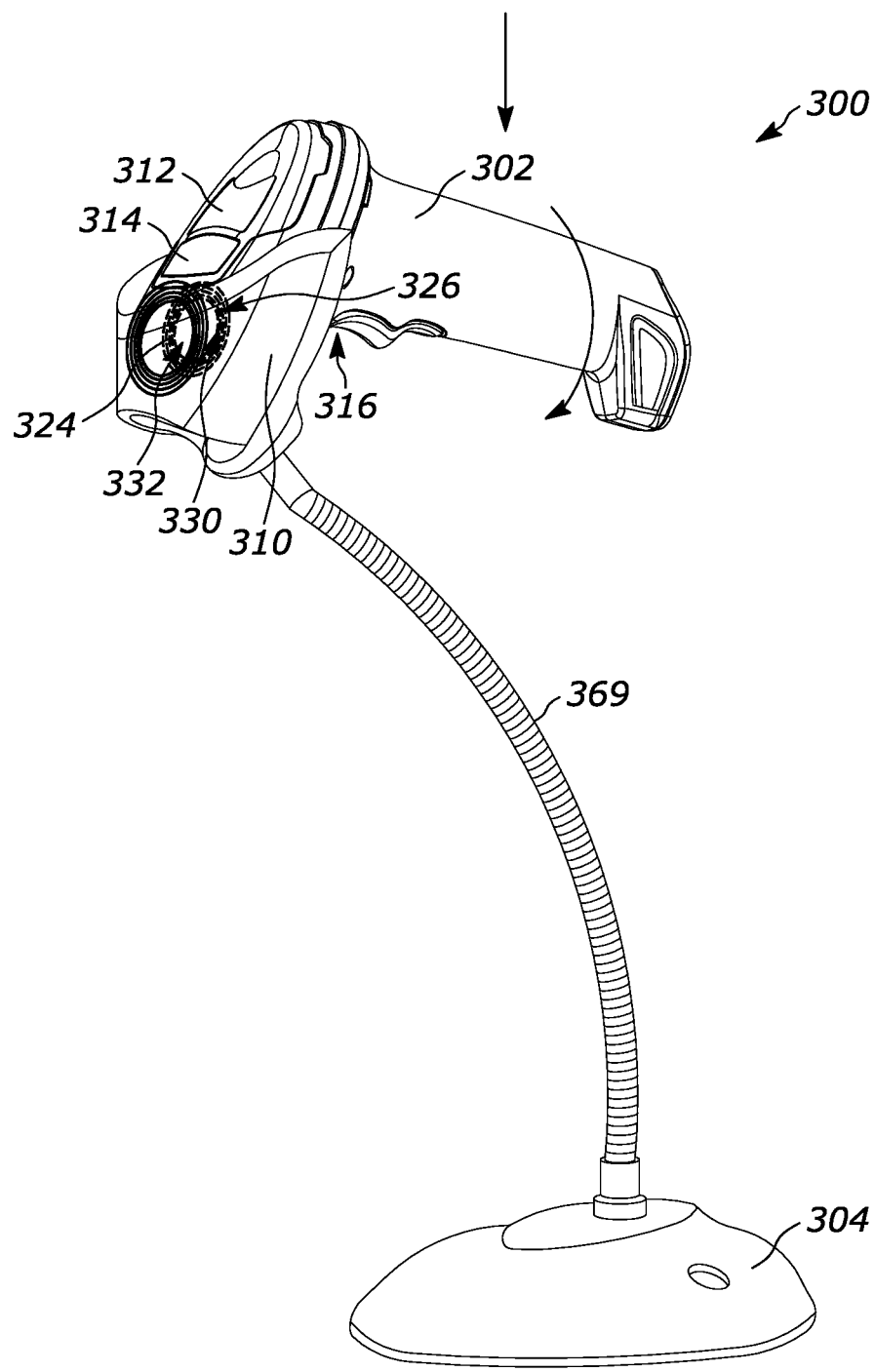
FIG. 3 is an isometric view of a third arrangement of a handheld barcode reader assembly having a reader, a stand, and inductive charging coils with the induction coils shown in a cut away view.
Figure 4:
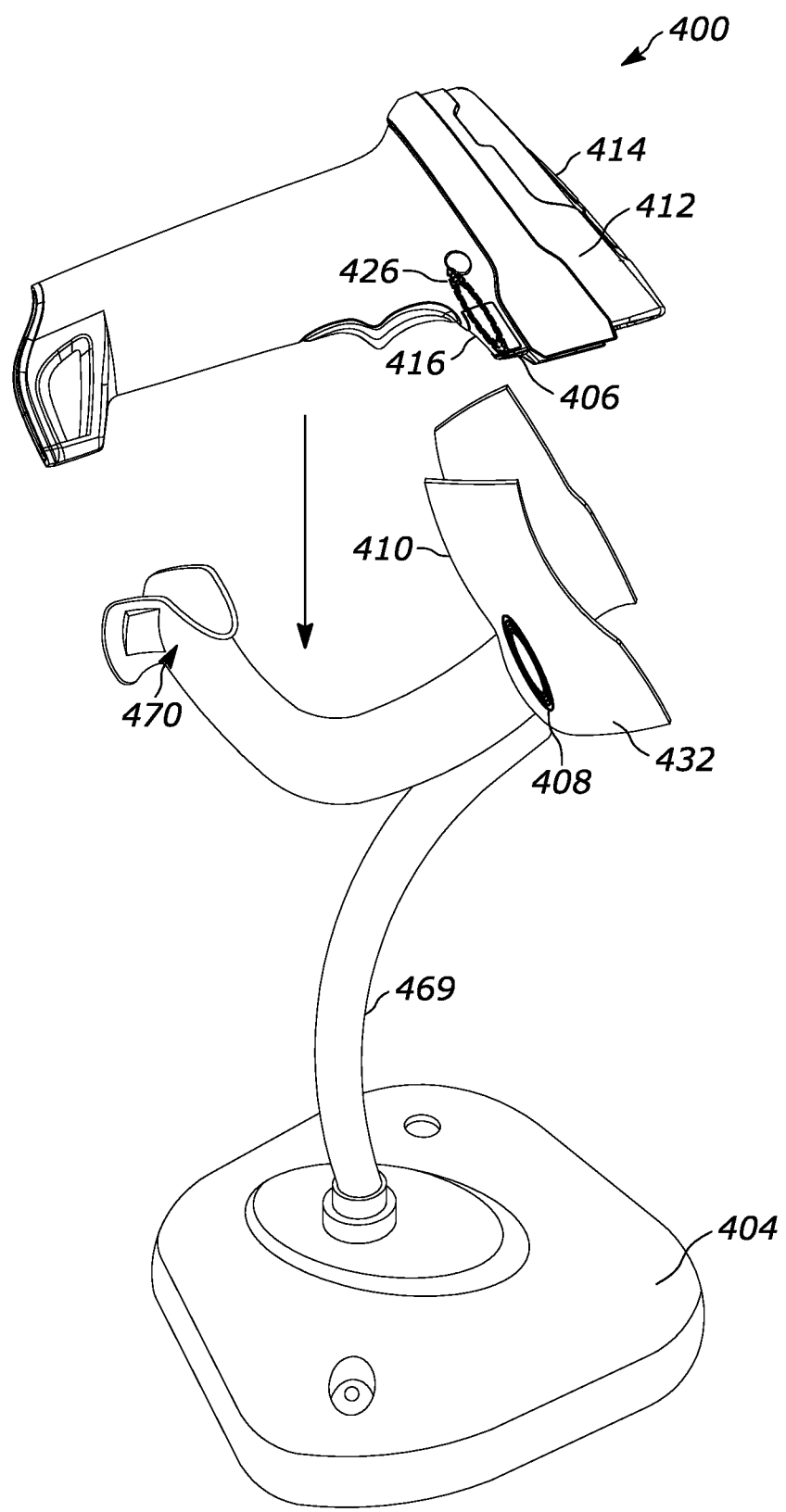
FIG. 4 is an isometric view of a fourth arrangement of a handheld barcode reader assembly having a reader, a stand, and inductive charging coils with the induction coils shown in a cut away view.

FIGS. 3 and 4 illustrates barcode reader assemblies 300 and 400 in which the stand 304, 404 includes a flexible arm 369, 469 connected to the base 328, 428. The cradle 310, 410 is a presentation cradle connected to the flexible arm 369, 469. The stand charging portion 332, 432 and the alignment features are located in the cradle 310, 410.

In FIG. 3, the cradle 310 covers the top 314 of the head 312 of the reader 302 when the reader 302 is in the charging position. The cradle 310 includes the stand enclosure 330 and stand charging portion 332. The reader enclosure 324 and the reader charging portion 326 are located at or near the top 314 of the head 312 of the reader 302. When the reader 302 is in the charging position, the stand charging portion 332 is adjacent the reader charging portion 326. The cradle 310 surrounds the head 312 of the reader 302, covering both the top 314 of the head 312 and the chin 316 of the head 312.

In FIG. 4, the cradle 410 covers only part of the head 412 of the reader 402, leaving the top 414 of the head 414 uncovered. Specifically, the cradle 410 engages the chin 416 of the head 412 of the reader 402. The cradle 410 includes the stand enclosure 430 and the stand charging portion 432. The reader enclosure 424 and the reader charging portion 426 are located at or near the chin 416 of the head 412 of the reader. When the reader 402 is in the charging position, the stand charging portion 432 is adjacent the reader charging portion 426. The stand 404 includes a secondary support 470 that engages either the handle 418 or the foot 422 of the reader 402 when the reader 402 is in the charging position. The secondary support 470 may adjust the positioning of the reader 402 such that the center of gravity of the reader 402 facilitates inductive charging by putting the first inductive coil 406 and second inductive coil 408 in greater proximity in the charging position when gravity acts on the barcode reader assembly 400.

Figure 5:
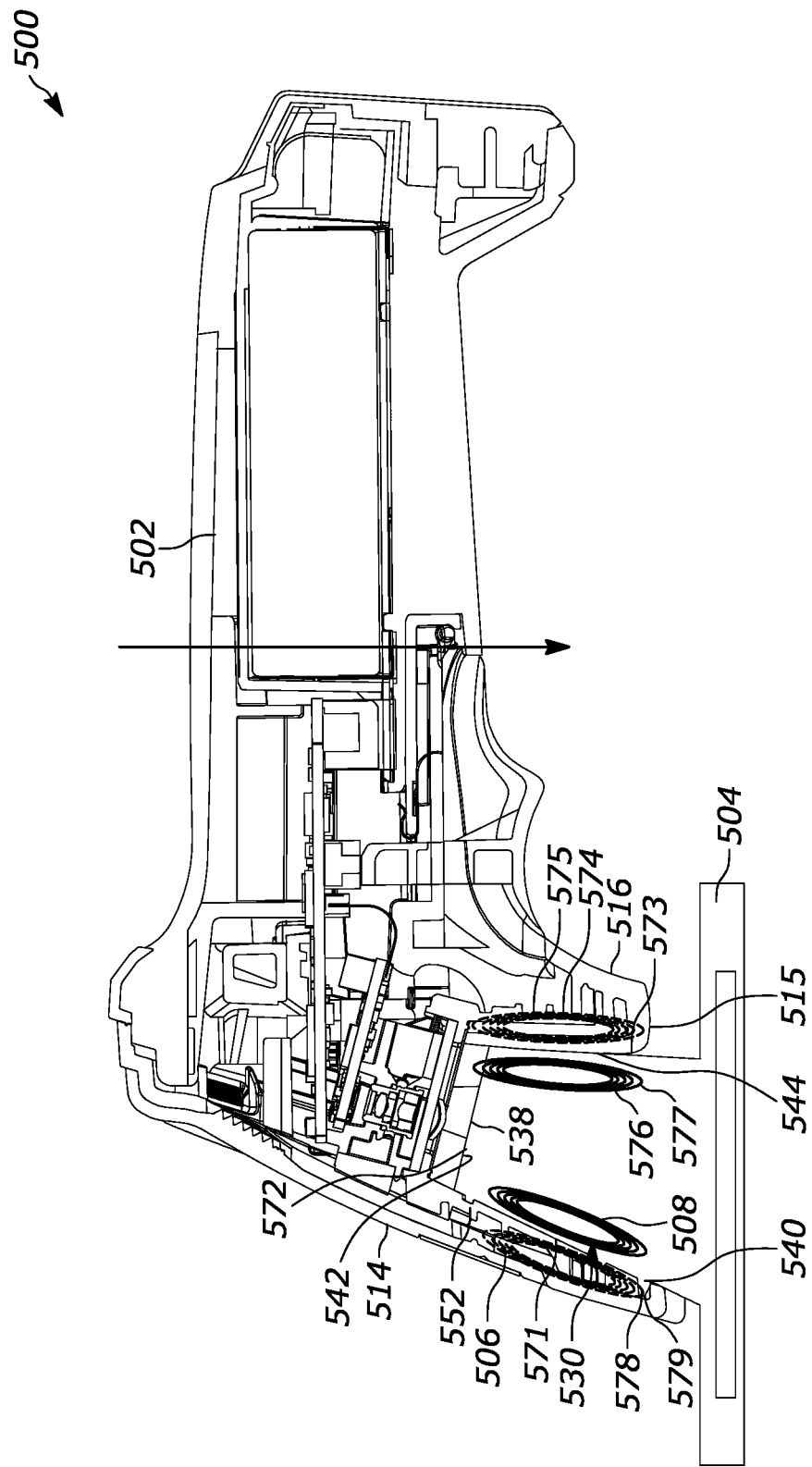
FIG. 5 is a cross-sectional side view of a fifth arrangement of a handheld barcode reader assembly having a reader, a stand, and inductive charging coils.

FIG. 5 illustrates a barcode reader assembly 500 where the stand 504 engages the cavity 538 of the reader 502. Specifically, the reader 502 has a cavity 538 in the nose 515 between the chin 516 and the top 514. The cavity 538 has a first cavity side 540, a second cavity side 542, and a third cavity side 544. The stand enclosure 530 includes a first enclosure side 571, and second enclosure side 572 and a third enclosure side 573. The first enclosure side 571 is configured to be adjacent to the first cavity side 540. The second enclosure side 572 is configured to be adjacent to the second cavity side 542. The third enclosure side 573 is configured to be adjacent to the third cavity side 544.

In the barcode reader assembly 500 shown in FIG. 5, the reader charging portion 552 is a first reader charging portion, and the first inductive coil 506 is provided in the first reader charging portion 552. The first reader charging portion 552 is located along the first cavity side 540. The stand enclosure 530 is a first stand enclosure, and the second inductive coil 508 is provided within the first stand charging portion 552. The first stand charging portion is located along the first enclosure side 571. The reader 502 further includes a second reader charging portion 574, and a third inductive coil 575 is provided within the second reader charging portion 574. The second reader charging portion 574 is located along the third cavity side 544. The stand 504 further includes a second stand charging portion 576. A fourth inductive coil 577 is provided within the second stand charging portion 576. The second charging portion is located along the third enclosure side 573. The first inductive coil 506 is configured for alignment with the second inductive coil 508. The third inductive coil 575 is configured for alignment with the fourth inductive coil 577.

Although not shown, the stand 504 of the barcode reader assembly 500 could include an opening between the second inductive coil 508 and the fourth inductive coil 577. The opening would extend through the stand 504, including through the base 528. In the charging position, the reader 502 could scan barcodes through the opening. The barcode reader assembly 500 could include a flexible arm, such as flexible arm 369 discussed above.

In FIG. 5, a securement recess 578 is provided in the first cavity side 540. The first enclosure side 571 includes a catch 579 to engage the securement recess 578. In the charging position, the catch 579 engages the securement recess 578 of the reader 502 to urge alignment of the first inductive coil 506 and the second inductive coil 508, and to further urge alignment of the third inductive coil 575 and the fourth inductive coil 577. The securement recess 578 may alternately be provided on the second cavity side 542 or the third cavity side 544, in which case the catch 579 is provided on either the second enclosure side 572 or the third enclosure side 573. The securement recess 578 and the catch 579 can be used to lock or secure the reader 502 to the scanner 504.

Figure 6:
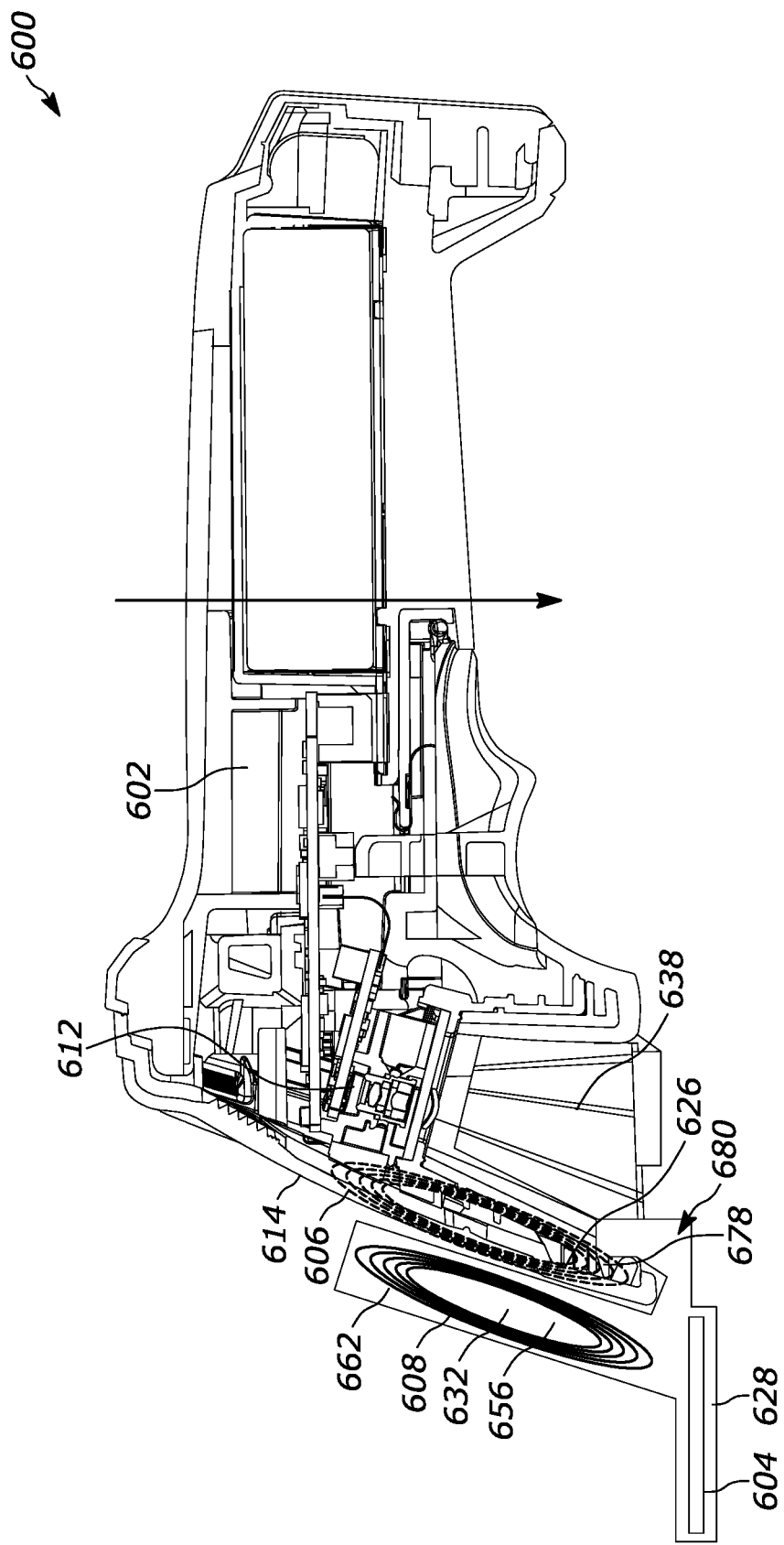
FIG. 6 is a cross-sectional side view of a sixth arrangement of a handheld barcode reader assembly having a reader, a stand, and inductive charging coils.

In FIG. 6, alignment features of the stand 604 include a locking clip 680 configured to engage the securement recess 678 in the cavity 638 of the reader 602. The base 628 is connected to a projection 662. The stand enclosure 630, stand charging portion 634, and second inductive coil 608 are provided within the projection 662. The projection 662 covers some of the top 614 of the head 612 of the reader 602. The reader charging portion 626, including the first inductive coil 606, is located at the top 614 of the head 612 of the reader 602.

Figure 7:
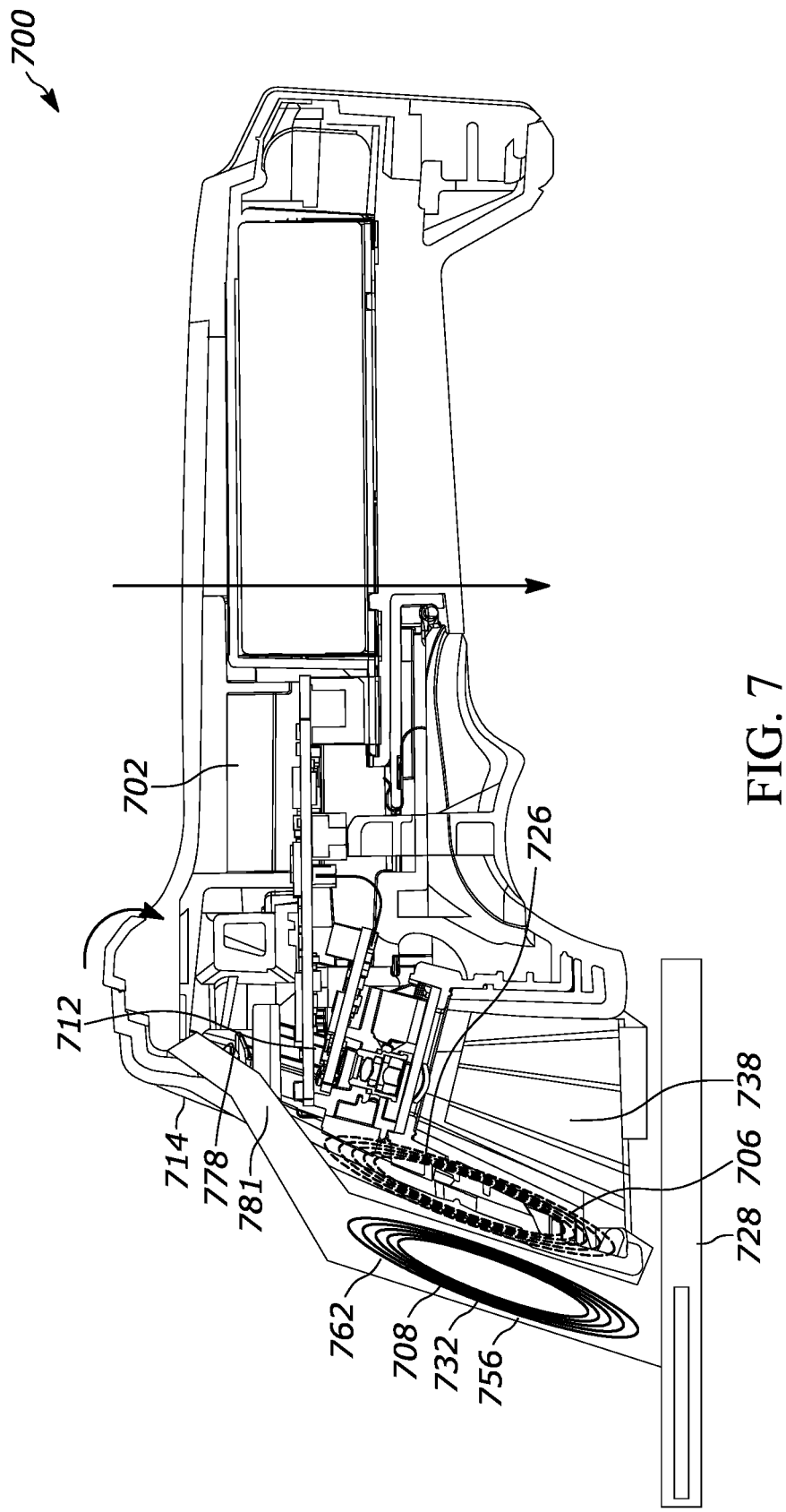
FIG. 7 is a cross-sectional view of a seventh arrangement of a handheld barcode reader assembly having a reader, a stand, and inductive charging coils.

In FIG. 7, the securement recess 778 is provided in the top 714 of the reader 702 instead of in the cavity 738. The base 728 is connected to a projection 762. The projection 762 covers some of the top 714 of the head 712 of the reader 702. A hook 781 extends from the projection 762 to engage the securement recess 778. The stand enclosure 730, stand charging portion 732, and second inductive coil 708 are provided within the projection 762. The reader charging portion 726, including the first inductive coil 706, is located at the top 714 of the head 712 of the reader 702. Upon placement of the reader 702 in the charging position, and more specifically, upon the placement of the hook 781 into the securement recess 778 of the head 712, the weight of the reader 702 rotates the reader 702 to urge the first inductive coil 706 and the second inductive coil 708 into closer proximity.

A variety of securement recesses, catches, and hooks are considered to be alignment features within the scope of this disclosure. A single barcode reader assembly may have a plurality of securement recesses, catches, and/or hooks. These alignment features may be located at, on, or in other locations of the reader or scanner than those described above. Further, male/female features may be reversed. For example, a securement recess may be provided in the stand, and the reader may include the hook (the reverse male/female configuration described with respect to FIG. 7).

Figure 8:
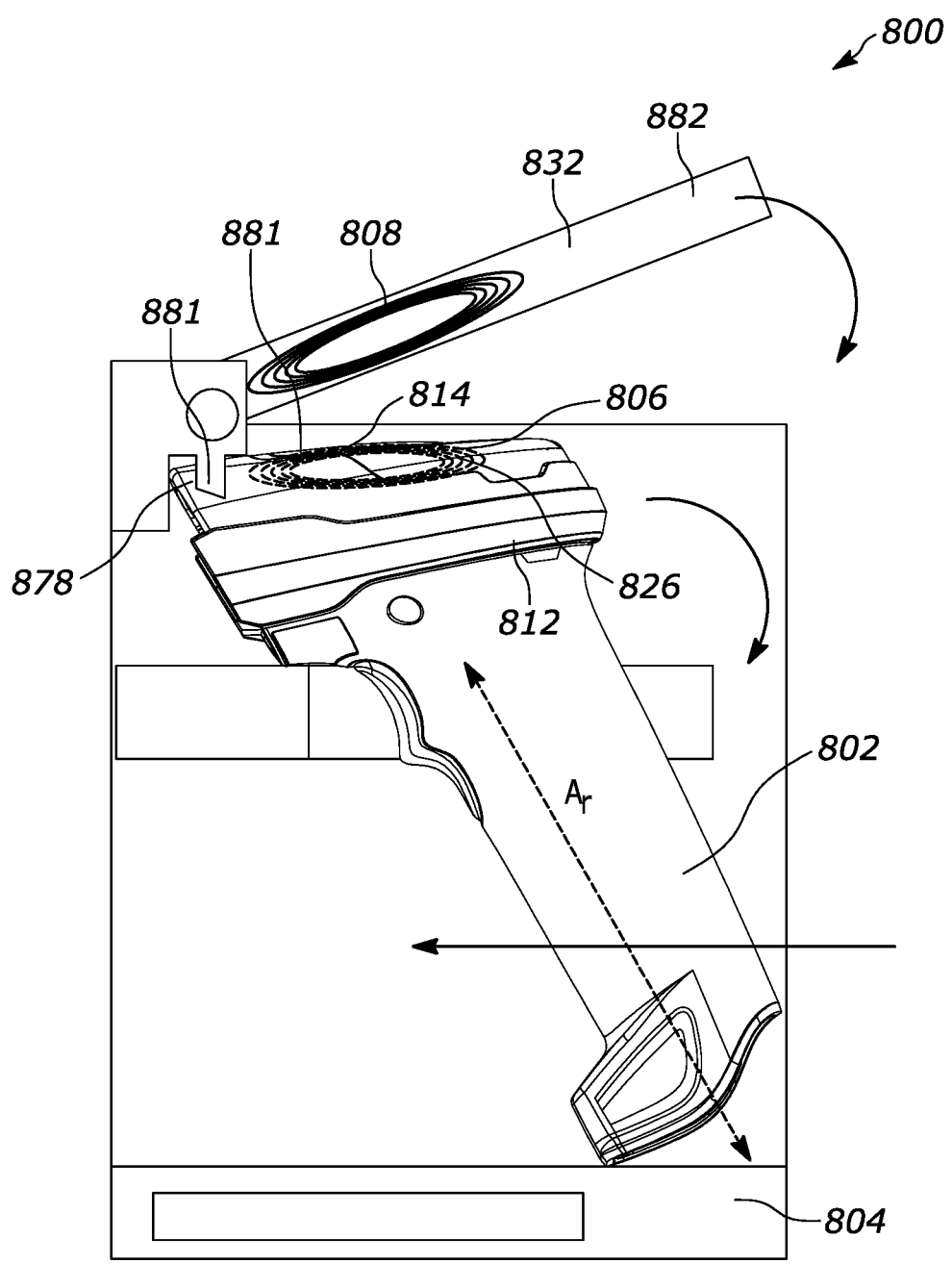
FIG. 8 is an isometric view of an eighth arrangement of a handheld barcode reader assembly having a reader, a stand, and inductive charging coils with the induction coils shown in a cut away view.

The barcode reader assembly 800 of FIG. 8 has a reader 802 with a securement recess 878 in the top 814 of the reader 802. The reader charging portion 826, including the first inductive coil 806, is located at the top 814 of the head 812 of the reader 802. The stand 804 includes a hook 881 which allows the reader 802 to hang within the stand 804. Additionally, the stand 804 includes a hinged flap 882 configured to cover the top 814 of the reader 802 when the reader 802 is in the charging position. The hinged flap 882 is rotatable relative to the longitudinal axis $A_r$ of the reader 802. When the reader 802 is hooked into the stand 804 via the securement recess 878 and the hook 881, the hinged flap 882 rotates downward to further drive the reader 802 into the charging position. The hinged flap 882 is adjacent the top 814 of the head 812 of the reader 802 when the reader 802 is in the charging position. The stand charging portion 854 and second inductive coil 808 are provided within the hinged flap 882. Thus, gravity encourages proximity between the first inductive coil 806 and the second inductive coil 808 by acting to rotate the hinged flap 882 toward to top 814 of the reader 802.

Figure 9:
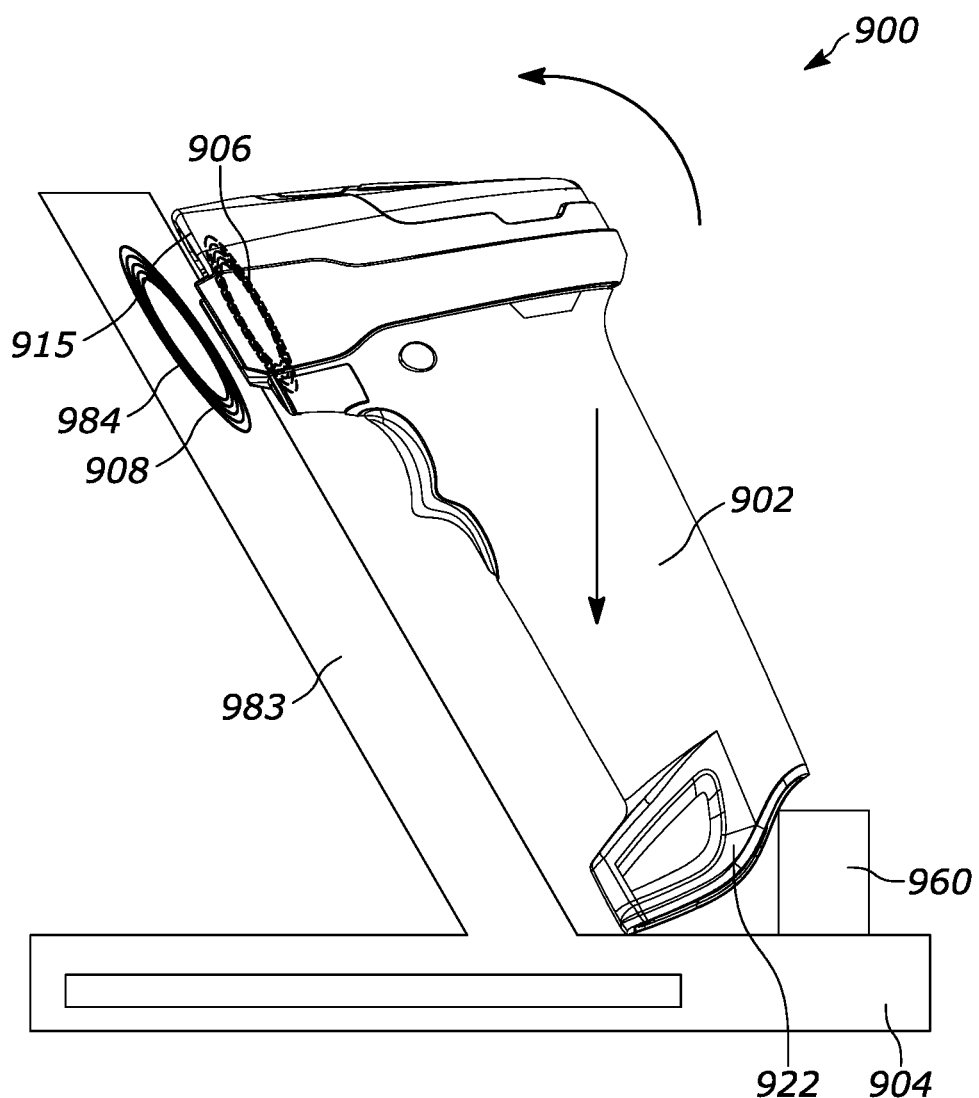
FIG. 9 is a side view of a ninth arrangement of a handheld barcode reader assembly having a reader, a stand, and inductive charging coils with the induction coils shown in a cut away view.

The barcode reader assembly 900 of FIG. 9 has a stand 904 with an inclined side 983 against which the reader 902 rests. The stand 904 further includes a foot platform 960 that holds the foot 922 of the reader 902 in place, thereby preventing the reader 902 from sliding down the inclined side 983. The first inductive coil 906 is provided along the nose 915 of the reader 902, and the second inductive coil 908 is provided in the inclined side 993 of the stand 904. An opening 984 is provided in the inclined side 993, allowing the reader to scan barcodes through the opening 984. The opening 984 may specifically be provided in the center of the second inductive coil 908. Although not depicted, the stand 904 could include vertical rails corresponding to vertical grooves or slots in the reader 902 to help the reader 902 slide into place.

Figure 10A:
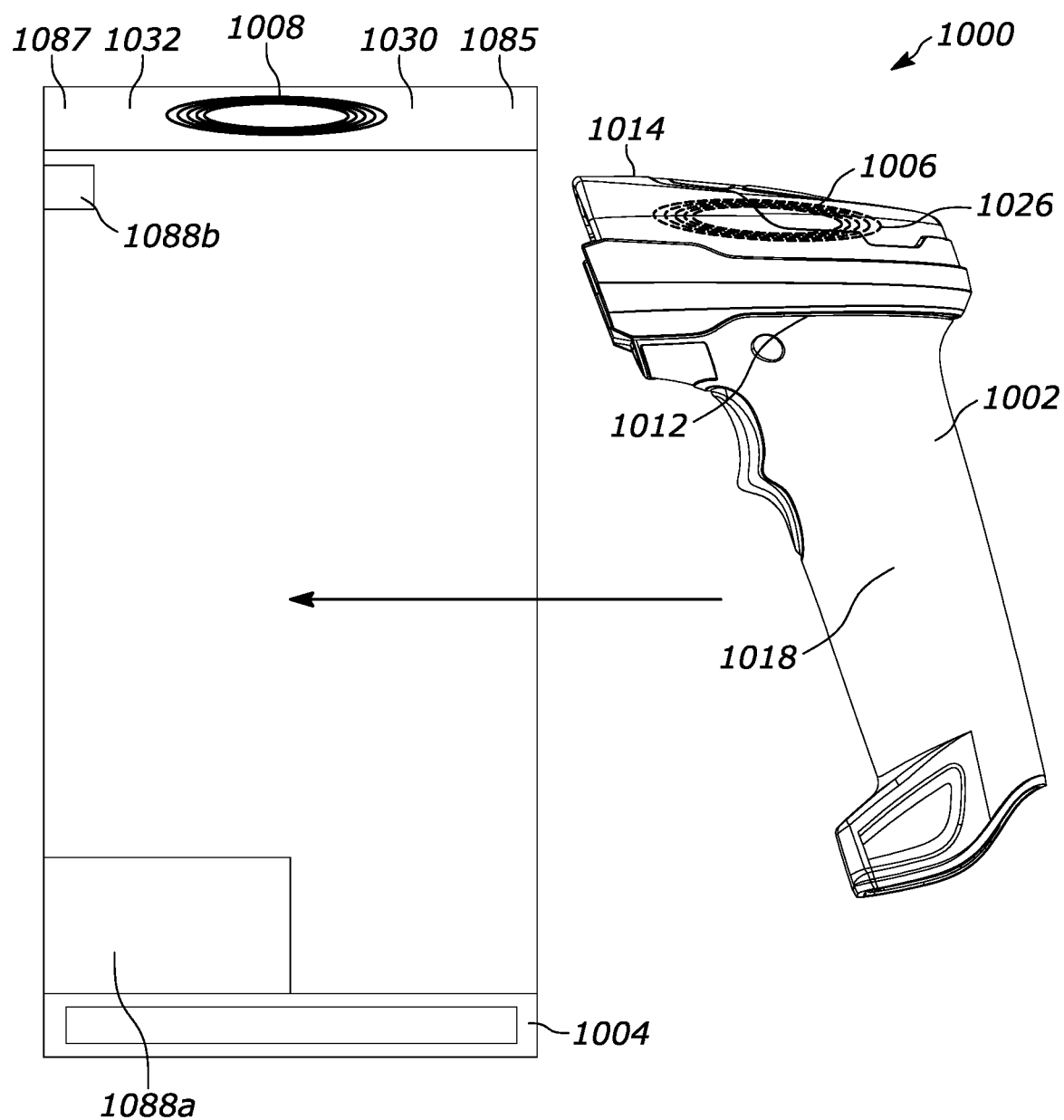
FIG. 10A is a side view of a tenth arrangement of a handheld barcode reader assembly having a reader, a stand, and inductive charging coils with the stand and induction coils shown in a cut away view.
Figure 10B:
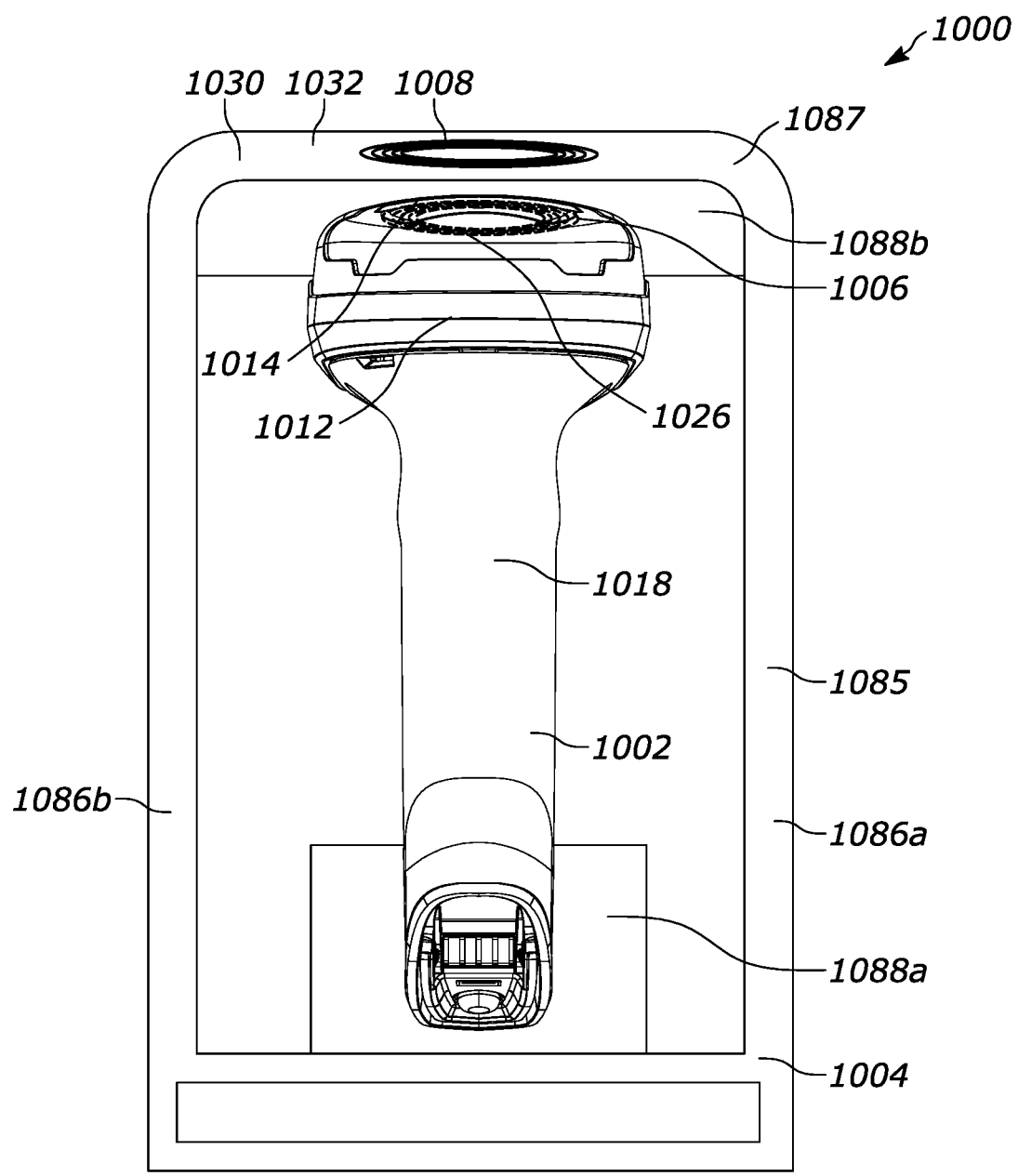
FIG. 10B is a front view of the tenth arrangement of a handheld barcode reader assembly of FIG. 10A with the induction coils shown in a cut away view.

The barcode reader assembly 1000 of FIGS. 10A and 10B has an enclosed stand 1004 with a frame 1085. As best shown in FIG. 10B, the frame 1085 has sides 1086a and 1086b that extend from the base 1028 and a top 1087 connected to the sides 1086a and 1086b. As shown in FIG. 10A, the enclosed stand 1004 includes stop features, such as stop features 1088a and 1088b, that help guide the reader to the correct charging position. In some instances, the stop features 1088a and 1088b may further include protrusions to help align the reader 1002 properly between the sides 1085a and 1085b. The reader charging portion 1026, including the first inductive coil 1006, is located at the top 1014 of the head 1012 of the reader 1002, and the stand enclosure 1030 having the stand charging portion 1032 with the second inductive coil 1008 is provided in the top 1087 of the stand 1004. The sides 1086a and 1086b are spaced away from the handle 1018 of the reader 1002 to enable a user to easily grab the handle 1018. Although not pictured, a slope on the base 1028 of the stand 1004 may help to urge the reader 1002 into the charging position. Additional alignment features, such as a spring or a locking clip, may also facilitate placement of the reader 1002 into the charging position.

Figure 11:
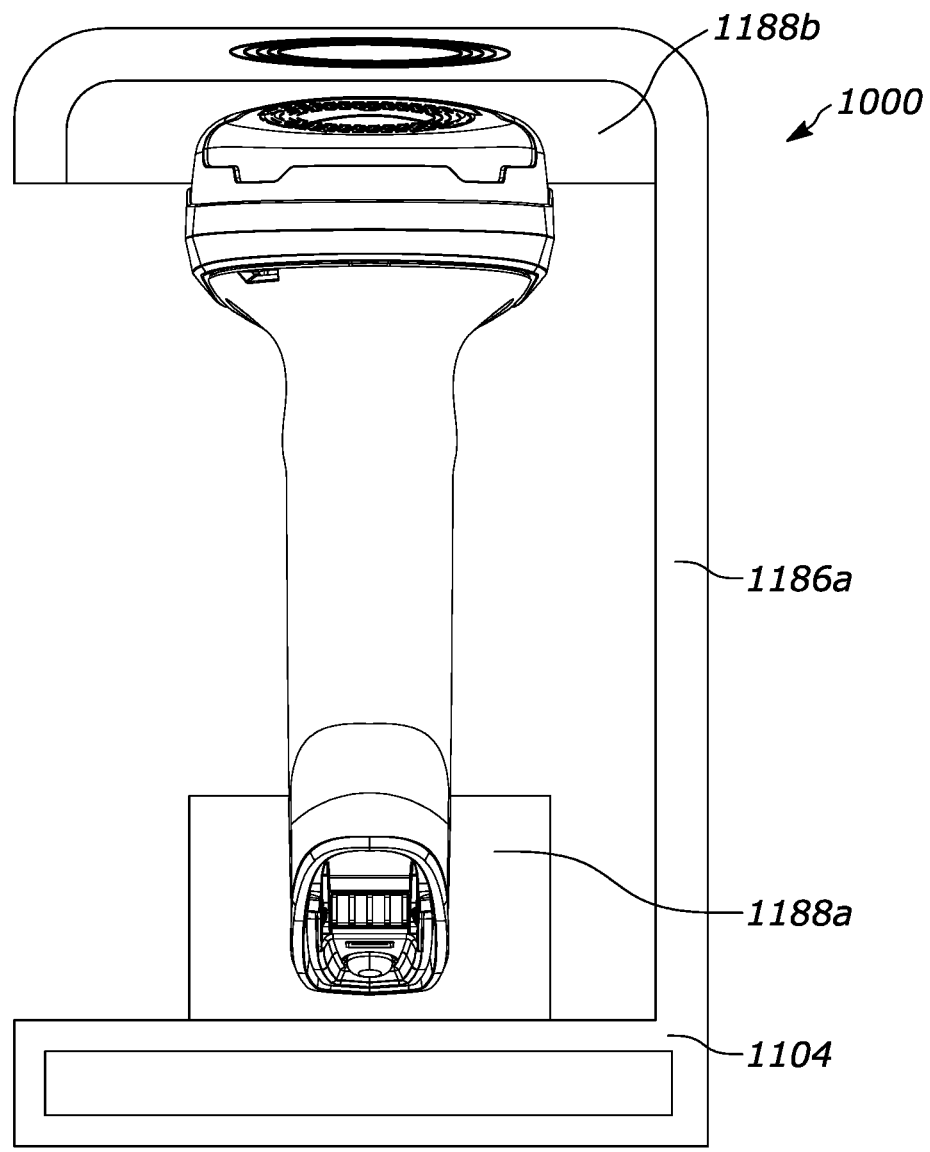
FIG. 11 is a front view of an eleventh arrangement of a handheld barcode reader assembly having a reader, a stand, and inductive charging coils with the induction coils shown in a cut away view.

FIG. 11 shows a barcode reader assembly 1100 that is generally identical to that shown in FIGS. 10A and 10B except that the stand 1104 has only one side 1186a. Having an open side allows the reader 1102 to be more easily grasped by a user. Other features, such as the stop features 1188a and 1188b, are otherwise the same as in the barcode reader assembly 1000 of FIGS. 10A and 10B.

Figure 12A:
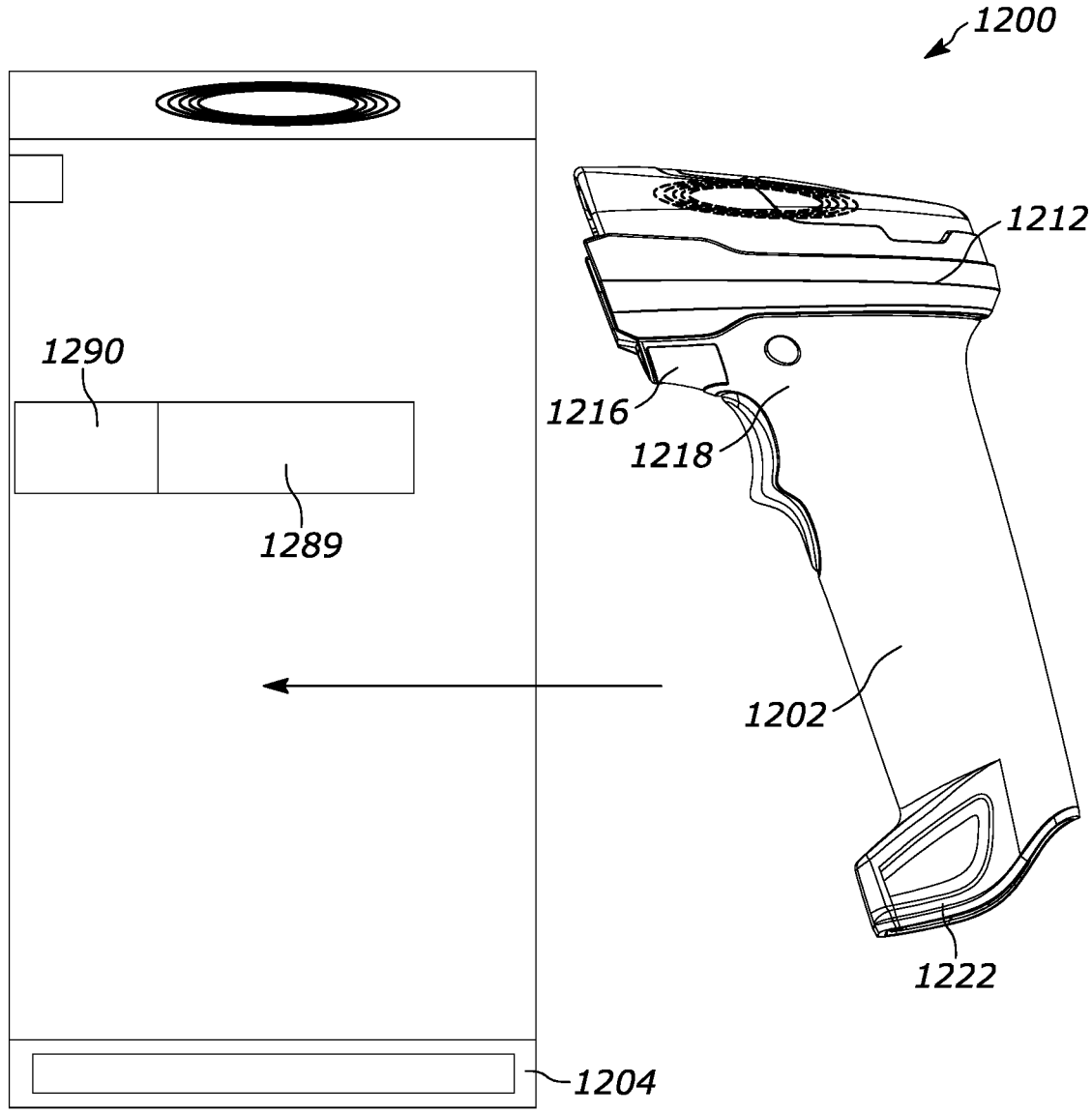
FIG. 12A is a side view of a twelfth arrangement of a handheld barcode reader assembly having a reader, a stand, and inductive charging coils with the stand and induction coils shown in a cut away view.
Figure 12B:
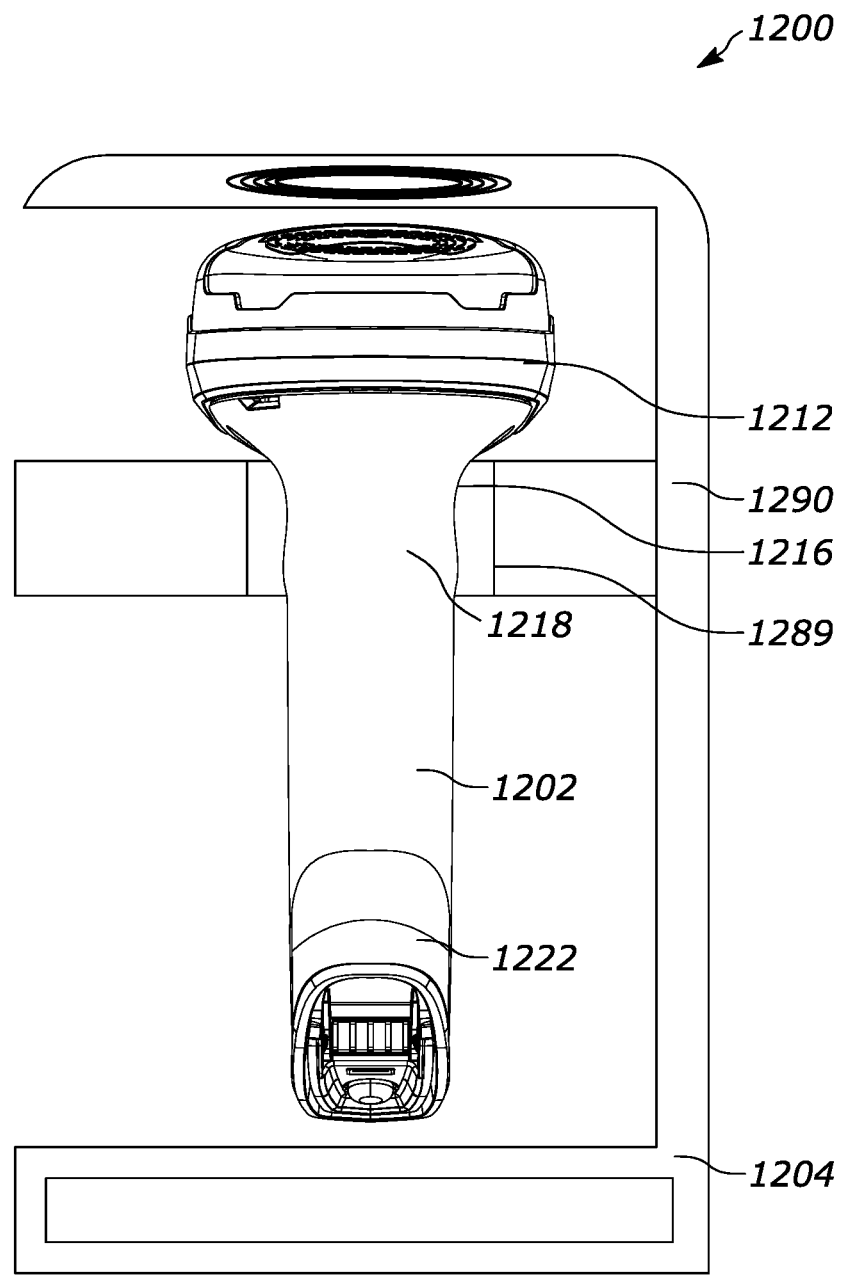
FIG. 12B is a front view of the twelfth arrangement of a handheld barcode reader assembly of FIG. 12A with the induction coils shown in a cut away view.

FIGS. 12A and 12B show a barcode reader assembly 1200 that is generally identical to that shown in FIG. 11 except that the stand 1204 includes a channel 1289. The channel 1289 engages the reader 1202 on the handle 1218 just below the chin 1216. In other arrangements within the scope of this disclosure, the channel 1289 may engage the reader 1202 at other locations, including but not limited to other locations on the handle 1018, on the head 1212, or on the foot 1222. The channel 1289 is connected to the side 1085a by a channel arm 1290. The channel arm 1290 is adjustable to allow different angles of scanning by the reader 1202.

Figure 13A:
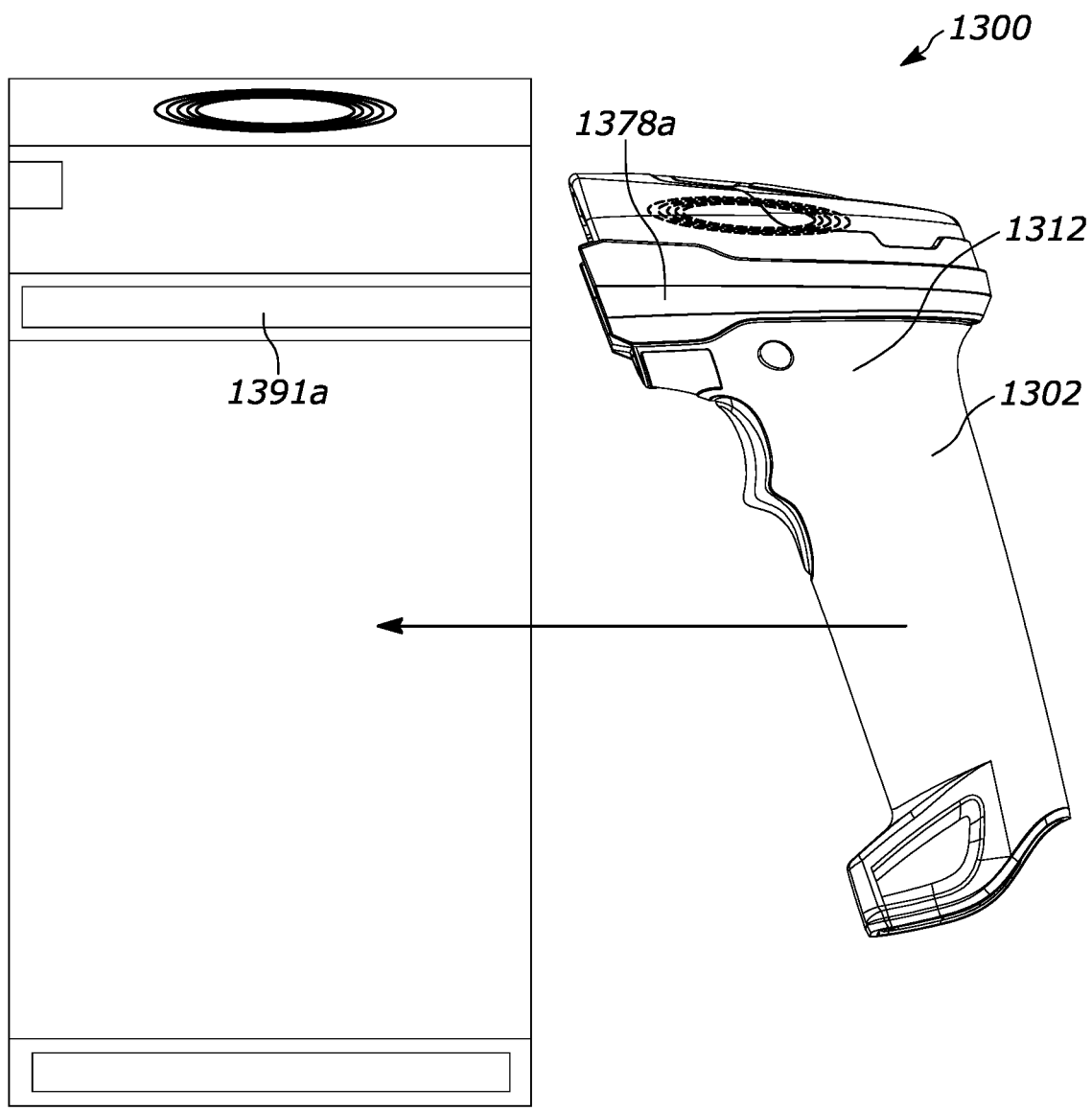
FIG. 13A is a side view of a thirteenth arrangement of a handheld barcode reader assembly having a reader, a stand, and inductive charging coils with the stand and induction coils shown in a cut away view.
Figure 13B:
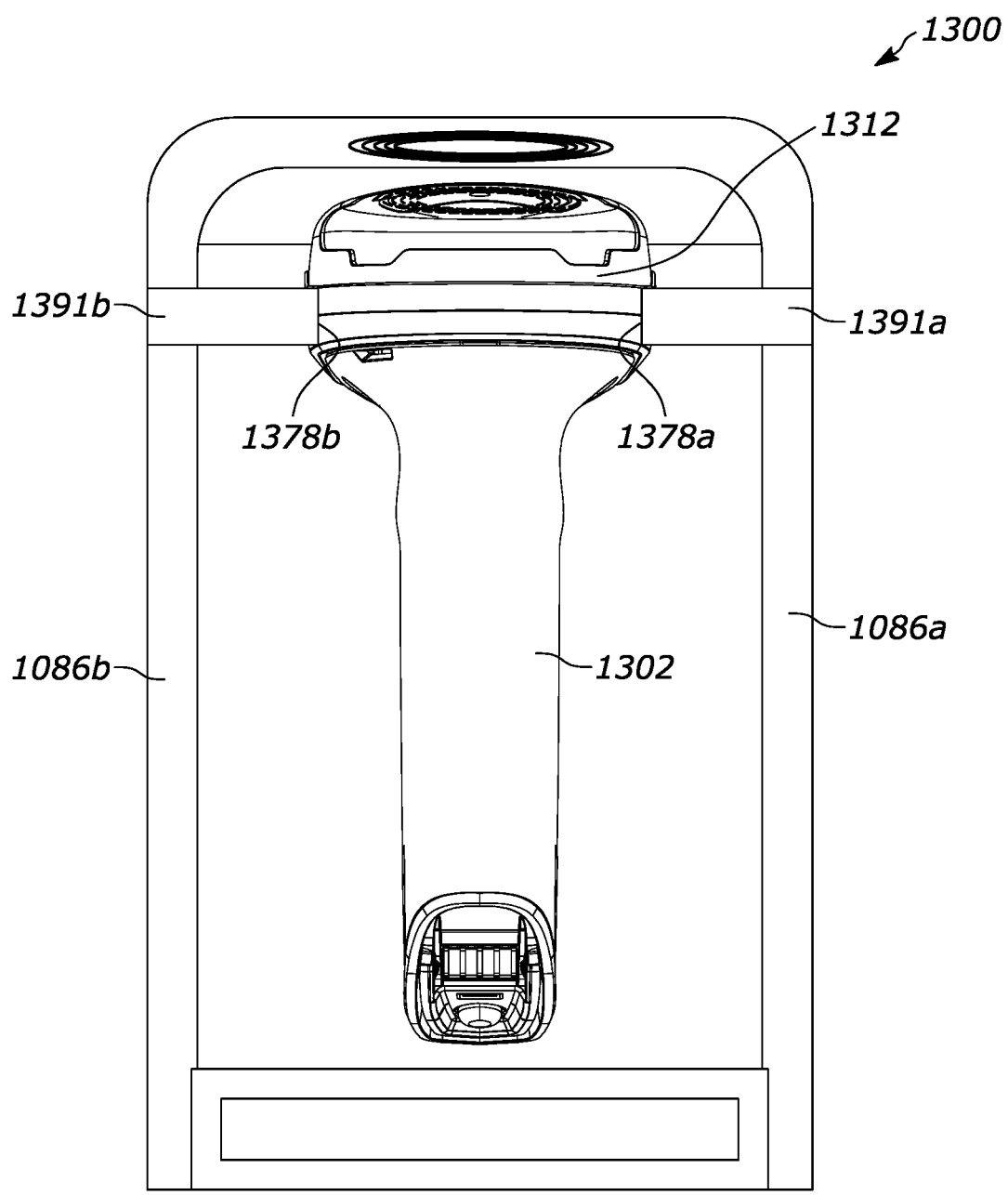
FIG. 13B is a front view of the thirteenth arrangement of a handheld barcode reader assembly of FIG. 13A with the induction coils shown in a cut away view.

FIGS. 13A and 13B show a barcode reader assembly 1300 that is generally identical to that shown in FIG. 10 except that, in lieu of stop feature 1088b, the reader 1302 is supported in a charging position by rails 1391a and 1391b. The rails 1391a and 1391b are connected on sides 1086a and 1086b, respectively. The head 1312 of the reader 1302 includes long securement recesses 1378a and 1378b to accommodate the rails 1391a and 1391b and allow the reader 1302 to slide along the rails 1391a and 1391b to the charging position.

Figure 14:
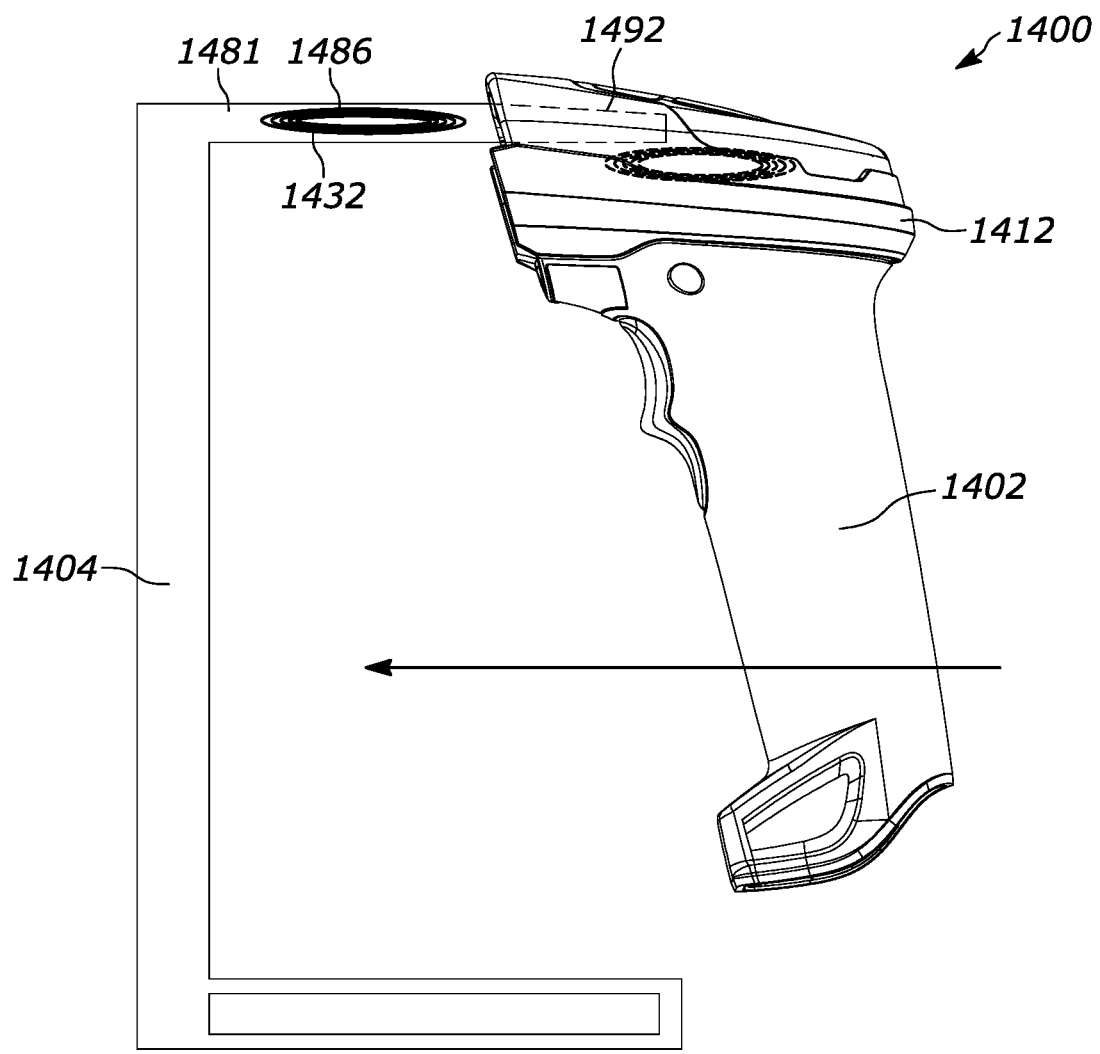
FIG. 14 is a side view of a fourteenth arrangement of a handheld barcode reader assembly having a reader, a stand, and inductive charging coils with the stand and induction coils shown in a cut away view.

FIG. 14 shows a barcode reader assembly 1400 that is generally identical to that shown in FIGS. 13A and 13B except that, instead of having rails 1391a and 1391b received by securement recesses 1378a and 1378b, the head 1412 of the reader 1402 has a pocket cavity 1492 into which the top 1486 of the stand 1404 is inserted. The top 1486 of the stand 1404 functions as a hook 1481, and the stand charging portion 1432 is located within the hook 1481. The reader 1402 slides over the top 1486 of the stand 1404 to the charging position and hangs vertically within the stand 1404 when the reader 1402 is in the charging position.

Figure 15:
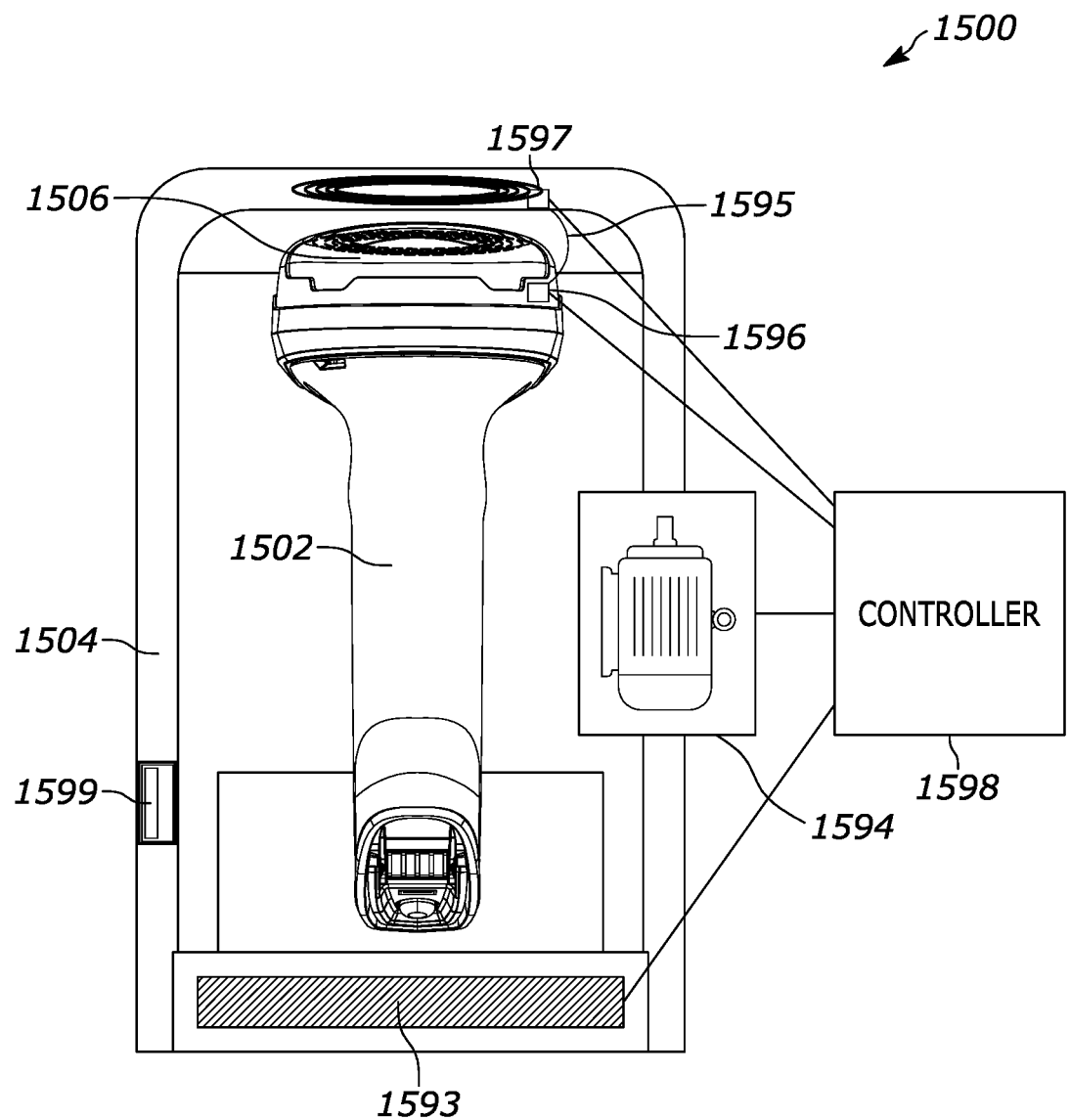
FIG. 15 is a front view of a schematic arrangement of a handheld barcode reader assembly having an alerting mechanism, a motor, and a sensor system.

FIG. 15 illustrates schematically a barcode reader assembly 1500 having an alerting mechanism 1593, a motor 1594, and a sensor system 1595. The alerting mechanism 1593, motor 1594, and/or sensor system 1595 are in communication, either directly or wirelessly, with a controller 1598. Although shown only in this arrangement of the barcode reader assembly 1500, the alerting mechanism 1593, motor 1594, and/or sensor system 1595 could be implemented in any of the barcode reader assemblies discussed herein. Further, though depicted on the stand 1504, the alerting mechanism 1593, motor 1594, and controller 1598 may be located on the reader 1502 instead or in addition. The controller 1598 may include a processor (e.g., a microprocessor) and a non-transitory memory for storing instructions to be executed by the processor.

The sensor system includes a first sensor component 1596 in operable communication with the first inductive coil 1506 in the reader 1502, and a second sensor component 1597 in operable communication with the second inductive coil 1508 in the stand 1504. The first sensor component 1596 and the second sensor component 1597 are also in communication with the controller 1598. The controller 1598 may be part of the reader 1502 or stand 1504 or may be separate. The sensor system 1595 may be a magnetic sensor system or a capacitive proximity sensor system. If the sensor system 1595 is a magnetic sensor system, the first sensor component 1596 is one of a magnetic field sensor and a magnet, and the second sensor component 1597 is the other of a magnetic field sensor and a magnet. If the sensor system 1595 is a capacitive proximity sensor system, the first sensor component 1596 is one of a capacitive proximity sensor and a capacitive component, and the second sensor component 1597 is the other of a capacitive proximity sensor and a capacitive component.

The alerting mechanism 1593 may be a visual, audial, audiovisual, tactile, or any other type of alerting mechanism. In some arrangements, the alerting mechanism 1593 may include a screen, such as an LED screen, that displays words or colors to convey the status of inductive charging. The alerting mechanism 1593 may include a speaker configured to make certain sounds to convey the status of inductive charging. The sounds may occur a certain intervals, may have a certain pitch, and/or may be set to a certain volume.

The purpose of the alerting mechanism 1593 may be multifold. The alerting mechanism 1593 may inform a user of a low charge of the first inductive coil 1506. The low charge of the first inductive coil 1506 may be identified using the sensor system 1595. A low charge may be detected by at least one of a differential threshold between the power in the first inductive coil 1506 and the second inductive coil 1508 being exceed, and the first inductive coil dropping below a minimum threshold based on coil efficiencies, charger efficiencies, and/or anticipated USB levels. The detection of the low charge may be determined by the controller 1598, into which the differential threshold and/or minimum threshold(s) may be set by a manufacturer or user. The alerting mechanism 1593 may also or alternately confirm charging of the first inductive coil 1506 when the reader 1502 is placed in the charging position. The alerting mechanism 1593 may sound the alert (visually, audibly, or in another way) when an adequate charge is detected in the first inductive coil 1506. The controller 1598 may determine whether the adequate charge has been detected based on a pre-set adequate charge amount set by a manufacturer or user.

In certain circumstances, such as when a low charge of the first inductive coil 1506 is detected as just described, the controller 1598 may instruct the motor 1594 to vibrate or otherwise contribute to movement of the reader 1502 or the stand 1504. The vibration may jostle the reader 1502 into the charging position, thereby ensuring that inductive charging is occurring and/or increasing the efficiency of inductive charging.

Also shown in FIG. 15 is a USB port 1599 in the stand 1504. The USB port 1599 is used to charge the second inductive coil 1508. In some arrangements, the second inductive coil 1508 is configured to receive only the current provided via USB charging. In other arrangements, other methods of charging may be alternately be used or may be used in conjunction with USB charging.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. Additionally, the described embodiments/examples/implementations should not be interpreted as mutually exclusive, and should instead be understood as potentially combinable if such combinations are permissive in any way. In other words, any feature disclosed in any of the aforementioned embodiments/examples/implementations may be included in any of the other aforementioned embodiments/examples/implementations.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A barcode reader assembly for inductive charging, the barcode reader assembly comprising:
   a reader having weight and a longitudinal axis, the reader including:
     a head including a nose extending outwardly from the longitudinal axis, a top surface, and a chin, wherein the top surface includes a securement opening,
     a handle connected to the head, the handle having a body,
     a foot connected to the handle, the foot extending outwardly from the longitudinal axis and the body of the handle, and
     a reader enclosure including a reader charging portion, a first inductive coil provided within the reader charging portion; and
   a stand including:
     a base, and
     a cradle extending from the base, the cradle including a stand enclosure having a stand charging portion, a second inductive coil provided within the stand charging portion, and the cradle further including a forward wedge extending upwards from the base, the forward wedge having a projection with a hook extending in a generally upwardly direction;
   wherein the first inductive coil and the second inductive coil each have a first coil axis and a second coil axis and, in a charging position, gravity and the cradle urge alignment of the first inductive coil and the second inductive coil along the first coil axis and the second coil axis and minimize a gap between the first coil axis and the second coil axis, and
   wherein, in the charging position, the hook of the projection is configured to protrude through the securement opening into an interior space of the head, the hook supporting the weight of the reader and causing the weight of the reader to urge the first inductive coil into proximity with the second inductive coil.

2. The barcode reader of claim 1,
   wherein the forward wedge is at least one of a first forward wedge configured to engage the head of the reader when the reader is in a charging position to prevent movement of the reader in the direction of the longitudinal axis of the reader, and a second forward wedge configured to engage the chin of the head of the reader when the reader is in a charging position to prevent movement of the reader in the direction of the longitudinal axis of the reader.

3. The barcode reader of claim 1, the stand further including a foot platform extending from the base.

4. The barcode reader assembly of claim 3, wherein the foot platform raises the foot of the reader above the nose of the reader when the reader is in the charging position.

5. The barcode reader assembly of claim 1, wherein the forward wedge includes a projection located along the top surface of the head of the reader when the reader is in a charging position, and wherein the second inductive coil is located in the projection of the forward wedge.

6. The barcode reader assembly of claim 5, wherein the projection includes a flared surface to facilitate placement of the head of the reader in the cradle of the base.

7. The barcode reader assembly of claim 1, wherein the stand includes a foot wedge configured to engage the foot of the reader when the reader is in the charging position to prevent movement of the reader along at least one of the longitudinal axis of the reader and the first axis of the first inductive coil.

8. The barcode reader assembly of claim 1, wherein the stand includes a USB port for charging the second inductive coil, and the second inductive coil is configured to receive only the current provided via USB charging.

9. The barcode reader assembly of claim 1, wherein the barcode reader assembly includes an alerting mechanism to inform a user of a low charge of the first inductive coil.

10. The barcode reader of claim 9, wherein the low charge of the first inductive coil is detected by at least one of a differential threshold between the power in the first inductive coil and the second inductive coil being exceeded, and the first inductive coil dropping below a minimum threshold based on coil efficiencies, charger efficiencies, and/or anticipated USB power levels.

11. The barcode reader assembly of claim 1, wherein the barcode reader assembly includes a motor to vibrate the reader into a charging position if a low charge of the first inductive coil is detected.

12. The barcode reader of claim 11, wherein the low charge of the first inductive coil is detected by at least one of a differential threshold between the power in the first inductive coil and the second inductive coil being exceeded, and the first inductive coil dropping below a minimum threshold based on coil efficiencies, charger efficiencies, and/or anticipated USB power levels.

13. The barcode reader assembly of claim 1, wherein the stand includes a projection located along the top surface of the head when the reader is in the charging position, and wherein the projection covers at least 60% of the top surface of the reader when the reader is in the charging position.

14. The barcode reader assembly of claim 1, wherein the barcode reader assembly includes an alerting mechanism to confirm charging of the first inductive coil when the reader is placed in the charging position that sounds only when adequate charge is detected in the first inductive coil.

15. The barcode reader assembly of claim 1,
wherein the barcode reader assembly includes one of the group consisting of a magnetic sensor system and a capacitive proximity sensor system to determine whether the reader is in the charging position,
wherein the magnetic sensor system includes a magnetic field sensor and a magnet, and wherein the capacitive proximity sensor system includes a capacitive proximity sensor and a capacitive component.

* * * * *